(12) United States Patent
Vegas et al.

(10) Patent No.: US 11,432,025 B1
(45) Date of Patent: Aug. 30, 2022

(54) MULTI-ENCODER BANDWIDTH LOAD BALANCING BASED ON VIDEO FORMAT FOR LIVE VIDEO STREAMING

(71) Applicant: Amazon Technologies, Inc., Seattle, WA (US)

(72) Inventors: Matthew Rives Vegas, Portland, OR (US); Brian J. Rundle, Portland, OR (US); Kevin Moore, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 16/708,268

(22) Filed: Dec. 9, 2019

(51) Int. Cl.
*H04N 21/2385* (2011.01)
*H04N 21/24* (2011.01)
*H04N 21/2343* (2011.01)

(52) U.S. Cl.
CPC ..... *H04N 21/2402* (2013.01); *H04N 21/2385* (2013.01); *H04N 21/23439* (2013.01)

(58) Field of Classification Search
CPC ......... H04N 21/2402; H04N 21/23439; H04N 21/2385
USPC ....................................................... 725/116
See application file for complete search history.

(56) References Cited

U.S. PATENT DOCUMENTS

| | | | | |
|---|---|---|---|---|
| 6,279,158 | B1 * | 8/2001 | Geile | H04B 10/272 725/126 |
| 6,990,667 | B2 * | 1/2006 | Ulrich | G06F 9/5083 718/105 |
| 8,797,840 | B2 * | 8/2014 | Oren | H04N 21/631 370/216 |
| 9,049,340 | B2 * | 6/2015 | Wang | H04L 65/80 |
| 9,660,922 | B2 * | 5/2017 | Ramakrishnan | H04N 21/23439 |
| 2002/0136298 | A1 * | 9/2002 | Anantharamu | H04N 21/2402 375/240.12 |
| 2003/0223466 | A1 * | 12/2003 | Noronha, Jr. | H04N 21/242 370/537 |
| 2005/0080850 | A1 * | 4/2005 | Salesky | G06F 3/04842 709/204 |
| 2008/0075462 | A1 * | 3/2008 | Kashima | H04J 14/005 398/58 |
| 2010/0131659 | A1 * | 5/2010 | Narayana | H04L 65/608 709/228 |
| 2011/0197239 | A1 * | 8/2011 | Schlack | H04N 21/2393 725/95 |

(Continued)

OTHER PUBLICATIONS

Al-Sarawi, Anbar, Alieyan, Alzubaidi, Internet of Things (IoT) Communication Protocols : Review, Oct. 25, 2017, 2017 8th International Conference on Information Technology (ICIT).*

*Primary Examiner* — Nathan J Flynn
*Assistant Examiner* — Caroline Somera
(74) *Attorney, Agent, or Firm* — Knobbe, Martens, Olson & Bear, LLP

(57) ABSTRACT

A system and method for management of bandwidth shared by a plurality of video content encoders is provided. A management service coordinates an unequal allocation of available bandwidth among a set of encoding nodes. A management service can receive measured bandwidth attributes from a plurality of encoding nodes to determine a total available bandwidth. The management service can then allocate the available bandwidth based by applying allocation criteria that related to attributes of the encoding process. The management service can then transmit the allocated bandwidth to the encoding nodes.

23 Claims, 13 Drawing Sheets

(56) References Cited

U.S. PATENT DOCUMENTS

| | | | |
|---|---|---|---|
| 2012/0051420 A1* | 3/2012 | Chen | H04N 19/115 375/240.02 |
| 2014/0025770 A1* | 1/2014 | Warfield | G06F 16/134 709/213 |
| 2014/0321274 A1* | 10/2014 | Gahm | H04L 47/193 370/231 |
| 2015/0046960 A1* | 2/2015 | Hardin | H04N 21/2383 725/95 |
| 2017/0126578 A1* | 5/2017 | Amulothu | H04L 47/70 |
| 2017/0195260 A1* | 7/2017 | Ma | H04L 69/40 |
| 2018/0359506 A1* | 12/2018 | Hodge | H04H 60/07 |

\* cited by examiner

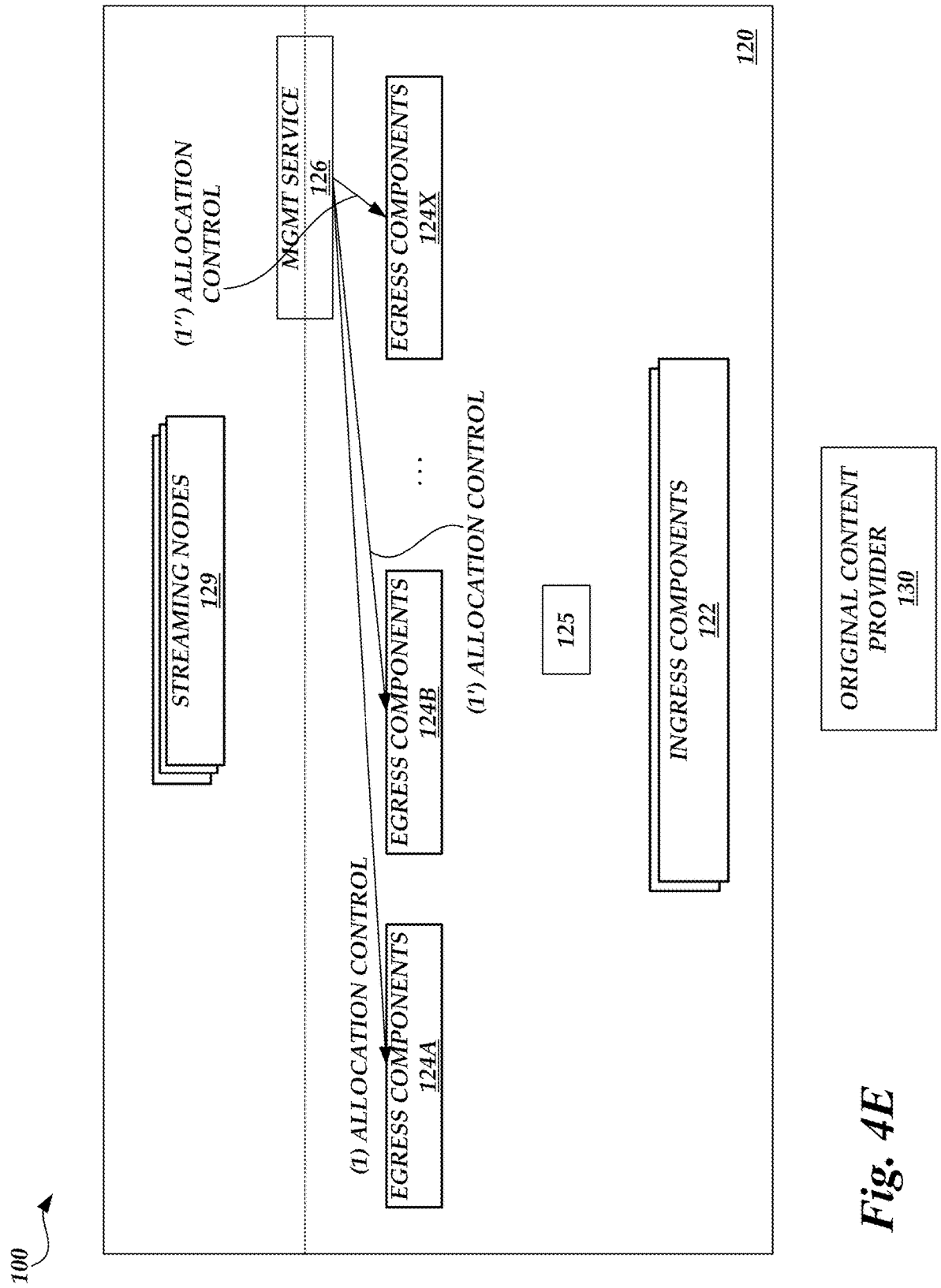

MULTI-ENCODER BANDWIDTH LOAD BALANCING BASED ON VIDEO FORMAT FOR LIVE VIDEO STREAMING

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service. As with content providers, content delivery service providers also provide requested content to client computing devices often with consideration of efficient transmission of the requested content to the client computing device or consideration of a cost associated with the transmission of the content. Accordingly, content delivery service providers often consider factors such as latency of delivery and resource allocation in providing requested content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 4A, 4B, 4C, 4D, 4E and 4F are block diagrams of illustrative components of the content delivery environment of FIG. 1A and FIG. 1B illustrating the interaction related to content delivery service for encoding content via a plurality of encoders and allocating bandwidth in accordance with an illustrative embodiment;

DETAILED DESCRIPTION

Figure 1A:
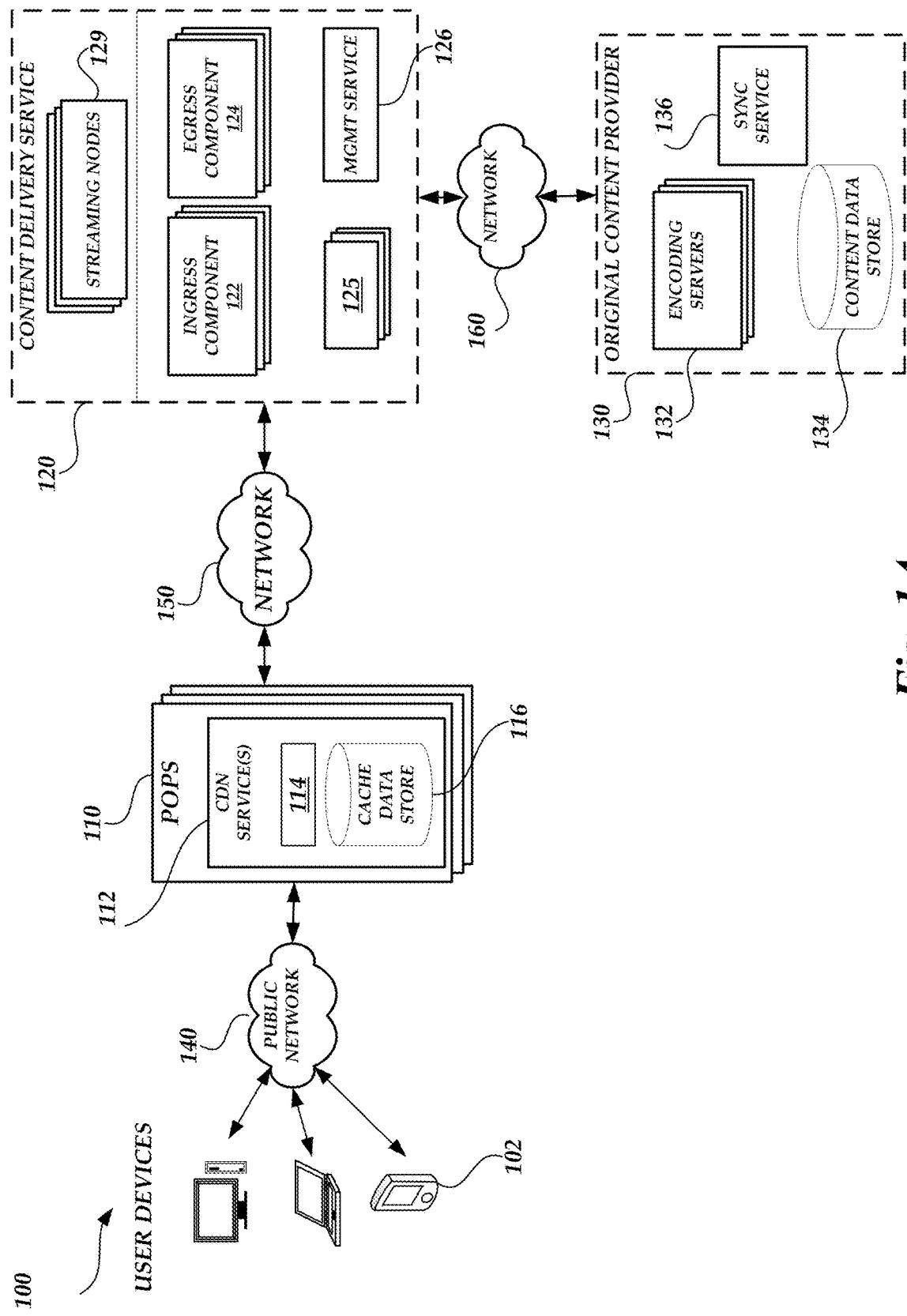
FIG. 1A is a block diagram of a content delivery environment that includes one or more user devices, a content delivery service and an original content provider according to one embodiment.

Generally described, content providers can provide content to requesting users. With regard to video content, a content provider can implement a content delivery service that is able to deliver video content to requesting users. Illustratively, a content delivery service indexes a collection of source video content (either live streaming or file-based video-on-demand) and processes it for delivery clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a content delivery service can also provide advanced video transmission features such as just-in-time packaging of video content, digital rights management ("DRM") encryption, time-shifting, bitrate selection, catch up TV, and more.

In some embodiments, to deliver content, content providers can organize individual content streams, such as a video file, into multiple segments that are then transmitted to requesting devices, segment by segment. For example, in a video stream, each segment typically accounts for 2-10 seconds of video rendered on a receiving device. To provide content to the content delivery environment, individual content segments can be encoded by an encoder and transmitted to the content delivery service. Traditionally, a single processing node on the content delivery service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are processed by the content delivery service, the content delivery service is available to receive and process requests for input content. More specifically, client computing devices, through a respective software application, can request individual video segments according to the available encoded bitrates and formats as published in the manifest file.

To receive input content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with additional information such as the encoding format utilized by the encoder to generate the output stream, color formatting, error rates or tolerance, and the like. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, it is not uncommon for a content delivery service provider to maintain a single node or server, e.g., an ingress node, to receive incoming encoded content streams and decode the source encoded content for further processing. More specifically, the single node can operate as an ingress node to receive individual content streams or channels corresponding to source encoded segments encoded to a specific encoding profile (e.g., encoding bitrate and format). The individual content streams or channels are provided by an original content provider. The single node can utilize state information that facilitates determination that all encoding versions of the same encoded segment have been received Thereafter, the content provider can make unencoded content available to one or more egress nodes, or encoders, that can process the decoded source content into one or more of the encoded content versions that will be available to requesting users. In some implementations, the content provider can then make the encoded content available to a delivery service or set of nodes that establish individual communication channels with end users and send the encoded, streaming content to the end user upon request.

In some embodiments, the content delivery service may generate multiple encoded content streams for transmission/delivery to the individual end users. More specifically, the content delivery service can utilize a set of encoding nodes that generate encoded content streams to a delivery service. In some embodiments, the set of encoding nodes can correspond to redundant encoding streams in which a first encoded content corresponds to a designated or determined primary encoded content stream and additional encoded content streams can corresponds to backup or secondary encoded content streams. In other embodiment, the set of encoding nodes that generate encoded content may be configured to transmit the content encoded according to different bitrate/format combinations. In this embodiments, the encoded content generated by the set of encoders can correspond to a common source content provided by an original encoded content provider or different source content provided by the original content provider or a set of original content providers.

Generally described, a content delivery service has a finite set of bandwidth resources that can be utilized by a set of encoders to transmit encoded content to the delivery service. Because the bandwidth is finite, in some embodiments, a set of content encoders may be competing for bandwidth to transmit encoded content, such as in a live streaming event. For example, in a sporting event, a content delivery service may be attempting to provide multiple encoded content for delivery based on different input streams received in the live sporting event. In such embodiments, individual encoders may be configured to attempt to consume all the available transmission bandwidth without consideration or logic for other encoding nodes or egress nodes attempting to transmit content. Such approaches can lead to inefficient allocation of content delivery service provider bandwidth resources. Additionally, in the event one encoder is able to tie up encoding bandwidth (such as in a race condition), the remaining encoders may not be able to effectively transmit encoded content or transmit encoded content in a delayed or lossy manner. Still further, many encoder nodes are not generally configured with communication functionality that facilitates any type of configuration of bandwidth resources or cooperation between encoder nodes. Such lack of communication functionality or requirement for a more complicated communication functionality limits the ability for encoder nodes to be able to dynamically modify attributes of the encoding nodes, especially encoding nodes working in conjunction.

To address at least a portion of the inefficiencies described above with regard to generating encoded content from a plurality of encoder, aspects of the present application corresponding to a content delivery service for managing streaming content. More specifically, aspects of the present application correspond to utilization of a management framework that facilitates the generation of encoded content streams by a plurality of encoders. Individual encoding nodes can utilize agents or other services to measure bandwidth attributes related to transmission. Such bandwidth attributes can include a determined or calculated net available bandwidth for a set of encoders. In turn, the individual nodes can transmit the measured bandwidth attributes to a management service. Illustratively, the encoding nodes of the content delivery service can utilize a specialized communication protocol, such as an Internet of Things (IoT)-based protocol, to transmit the measured bandwidth attributes. Such as IoT-based protocols can include the MQ Telemetry Transport (MQTT) protocol or other lightweight messaging protocol for transmitting the measured communication attributes.

Upon receipt of the measured communication attributes, the management service (or an individual encoder configured with management functionality) can identify encoding nodes that are sharing communication bandwidth, determine the total available communication bandwidth, and select bandwidth selection criteria. In one embodiment, the management service can utilize load balancing criteria or bandwidth distribution criteria to allocate at least a portion of the determined available bandwidth in an unequal manner among the encoding nodes. Such criteria can include, but are not limited to, performance, financial cost, content type, original content provider identification information, and the like. In another embodiment, the management service can determine that one of the encoding nodes represents a primary or designated role of the encoded content stream and that two or more additional encoded nodes represent secondary or redundant encoded content streams. In such an embodiment, the management service can then allocate the bandwidth in a non-equal manner that prefers that primary or designated source of the encoded content. In another embodiment, the management service can determine or identify that two or more encoding nodes are generating encoded content according to different encoding bitrate and format combinations. In such an embodiment, the management service can then allocate the bandwidth in a non-equal manner that prefers encoding bitrate/format combination that are associated with higher amounts of data, such as encoding bitrate data, color data, error rates, etc.

Once the management service determines the allocations, the management service can then utilize a specialized communication protocol, such as an IoT-based protocol, to transmit the measured bandwidth attributes. As described above, illustrative IoT-based protocols can include the MQTT protocol or other lightweight messaging protocol for transmitting the bandwidth allocations to the encoder nodes.

The content delivery service, through the encoding nodes, can then provide encoded content streams for delivery to end users, such as through a communication channel established by a delivery component of the content delivery service. By processing the measured bandwidth attributes from a set of encoding nodes, in accordance with aspects of the present application, a management service can better optimize available bandwidth and eliminating/mitigating bandwidth competition between encoding nodes. Additionally, in accordance with other aspects of the present application, through the utilization of IoT-based protocols, the encoding nodes do not require complex communication functionality and can be configured with a finite set of communication protocol functionality that facilitates transmitting measured bandwidth attributes, transmitting other encoding attributes, receiving bandwidth allocations, receiving other configuration information, and the like. The encoding nodes can then modify the encoding process according to received allocations.

Aspects of the present application will be described with regard to illustrative streaming content protocols, content lengths and specific examples. However, one skilled in the relevant art will appreciate that such aspects of the present application are not limited to the illustrative examples and that such examples should not be construed as limiting.

FIG. 1A illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a content delivery service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. Accordingly, communication times and capabilities may vary between the components of FIG. 1.

In accordance with embodiments, for purposes of illustration, the content delivery service 120 includes one or more servers for receiving content from original content providers 130 and processing the content to make available a set of received encoded bitrate segments, such as via a video packaging and origination service. The components of the content delivery service 120 may provide the encoded content to a separate stand-alone services, such as content delivery service, for subsequent transmission to user devices 102 or a CDN service '110. In other embodiments, the illustrated components of the content delivery service 120 may be integrated or form a part of a content delivery service environment. Accordingly, the term content delivery service 120 may be generally variable and is not limited to any particular implementation.

As described in further detail below, the content delivery service 120 includes a plurality of ingress components 122 (e.g., "decoders" or "decoding nodes") utilized to receive encoded data streams from encoding servers 132 from content providers 130. Illustratively, the ingress components 122 can process the incoming encoded content from the original content providers 130. The content delivery service 120 also includes one or more egress components 124 (e.g., "encoders" or "encoding nodes") encoding decoded content into a bitrate and format for delivery to user devices. The ingress components 122 and egress components 124 may be distributed according to geographic criteria or availability zones to facilitate delivery or access to encoded content. Additionally, although the ingress components 122 and egress components 124 are illustrated as separate components, in some embodiments, one or more computing device may be configured to implement the functionality associated with both the ingress components 122 and egress components 124. An illustrative configuration of ingress components 122 (decoding nodes) and egress components 124 (encoding nodes) will be illustrated in greater detail with regard to FIG. 1B.

The content delivery service 120 can further include management service 126 for managing the allocation of bandwidth for a set of egress components 124 (encoding nodes) based on measured bandwidth by individual egress components 124 as will be described herein. Still further, the content delivery service 120 can include a plurality of cache components 125 that maintain decoded input content generated by the ingress components 122 from the original content provided by the original content provider 130. The content delivery service 120 can further a plurality of streaming nodes 129 that correspond to a content delivery component for establishing individual communication channels with user device 102. Each streaming node 129 can correspond to an individual user device 102, groupings of user devices 102 (e.g., by household or region), or combinations thereof. Illustratively, in one embodiment, the streaming nodes 129 can correspond to a separate service that is independent of a different service incorporating the ingress components 122 and egress components 124. Accordingly, the illustrated relationship in FIG. 1A is only logical in nature.

It will be appreciated by those skilled in the art that the content delivery service 120 may have fewer or greater components than are illustrated in FIG. 1A. Thus, the depiction of the content delivery service 120 in FIG. 1A should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Still further, aspects of the present application relate to the selection of individual ingress servers 122, egress servers 124 and cache components 125 based on attributes of the components, such as geographic information, logical network information, and the like. Accordingly, while such components are illustrated as logically being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1A, the content delivery environment 100 also includes original content providers 130. Illustratively, the original content provider can include a plurality of encoders 132 for generating multiple encoded streams for transmission to the content delivery service 120. In one embodiment, individual encoders may generate different encoded versions of a content segment according to a different encoding profile. The original content provider 130 can also include logic or other management components for determining how many encoders 132 should be utilized or how to manage the addition or removal of encoders. In some embodiments, the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like.

Figure 1B:
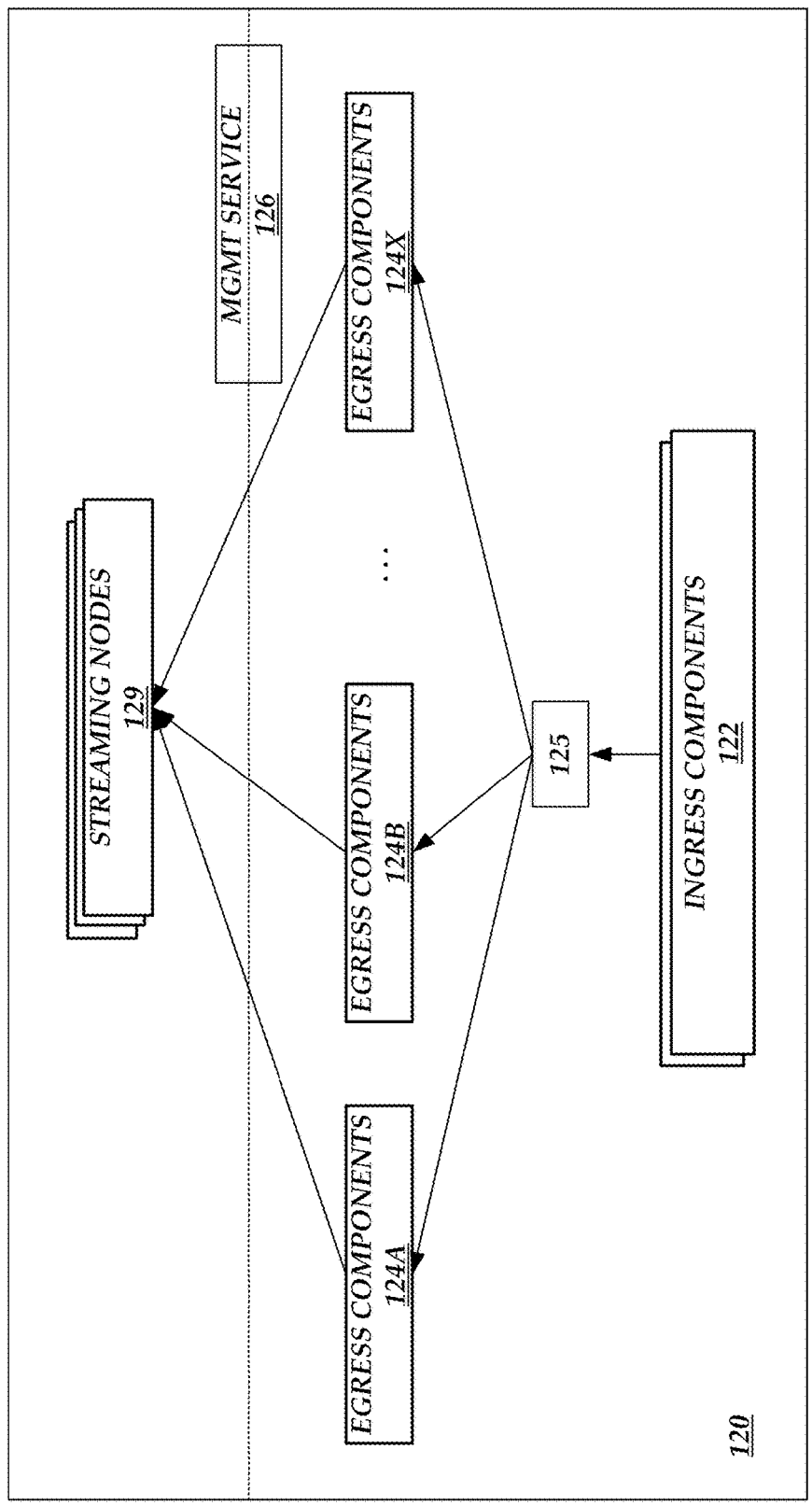
FIG. 1B is a block diagram of the content delivery environment of FIG. 1A illustrating components of a content delivery service in accordance with an illustrative embodiment.

With reference now to FIG. 1B, an illustrative arrangement of ingress components 122 (decoding nodes), cache servers 125, egress components 124 (encoding nodes), streaming nodes 129 and the management service 126 will be described. As illustrated in FIG. 1B, one or more ingress components (decoding nodes) can receive (directly or indirectly) original content from original content providers 130. In some embodiments, the original content is encoded in a bitrate/format that represents a higher (or highest) quality that will be eventually transmitted to requesting users by the content delivery service 120. The decoding nodes 122 will decode the content and store the unencoded nodes in a memory, such as cache 125 that is accessible to one or more encoding nodes 124. In a streaming embodiments, the decoding node continuously receives, decodes and stores the original content. Additionally, the decoding nodes 122 can processing multiple content streams from the same or different original content providers 130.

Once unencoded content is available at the cache 125 (or other memory), one or more encoding nodes 124 will access the unencoded content and begin generating encoded content. Individual encoding nodes can be configured to encode content according to different encoding bitrate/format combinations, such as to support ABR. In other embodiments, multiple encoding nodes 124A, 124B . . . 124X may be configured to encode the same content according to the same encoding bitrate/format combination to represent redundant or duplicative encoded content streams. In other embodiments, the encoding nodes 124A, 124B . . . 124X may access different unencoded content such that there is no overlap, commonality or overlap in the generated encoded content. As will be described and illustrated in FIGS. 4A-4E, the management service 126 can be configured to communicate with encoding nodes 124A, 124B, . . . 124X via an IoT-based protocol that facilitates the collection of available bandwidth measures by the individual encoding nodes, the determination of an allocation and the transmission of the determined allocation by an IoT-based protocol. Additionally, as will be illustrated in FIG. 4F, in some embodiments, the functionality associated with the management service 126 can be incorporated into one or more encoding nodes 124 in a manner that does not require or is at least partially duplicative of the management service 126.

Figure 2:
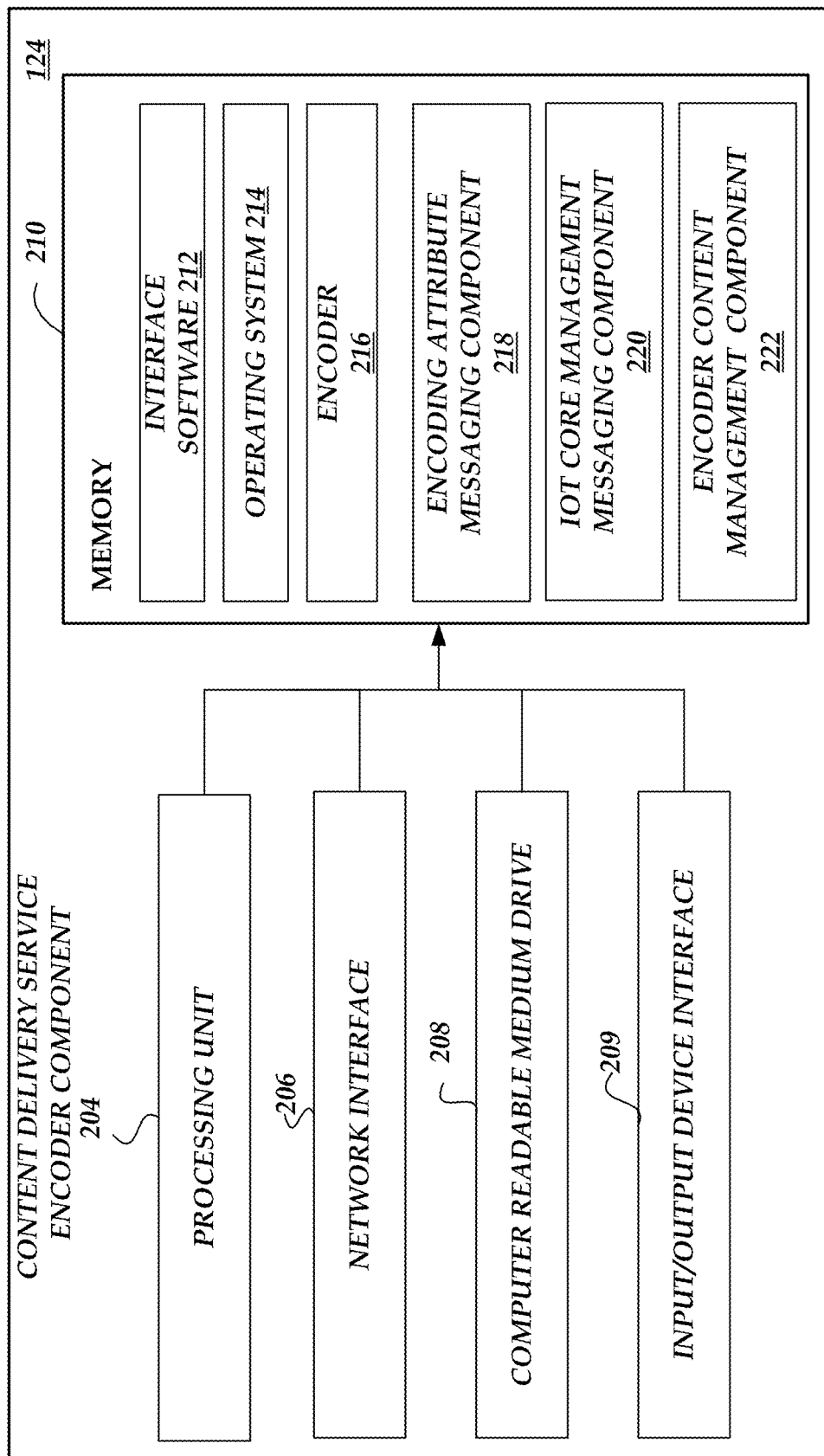
FIG. 2 is a block diagram of illustrative components of an encoder component configured to generated encoded content and receive configuration information in accordance with an illustrative embodiment.

FIG. 2 depicts one embodiment of an architecture of an illustrative encoder node 124 (egress node) for encoding content as described herein. The general architecture of the encoder 124 depicted in FIG. 2 includes an arrangement of computer hardware and software components that may be used to implement aspects of the present disclosure. As illustrated, the encoder 124 includes a processing unit 204, a network interface 206, a computer readable medium drive 208, an input/output device interface 209, all of which may communicate with one another by way of a communication bus. The components of the encoder 124 may be physical hardware components or implemented in a virtualized environment.

The network interface 206 may provide connectivity to one or more networks or computing systems, such as the network 150 or network 160 of FIG. 1A. The processing unit 204 may thus receive information and instructions from other computing systems or services via a network. The processing unit 204 may also communicate to and from memory 210 and further provide output information for an optional display via the input/output device interface 209. In some embodiments, the encoder 124 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the content delivery service 120. The memory 210 may further include computer program instructions and other information for implementing aspects of the present disclosure. For example, in one embodiment, the memory 210 includes interface software 212 for receiving and processing content for the content delivery service 120.

Additionally, the memory 210 includes an encoder component 216 for processing content segments to generate encoded content in accordance with a specified bitrate/format. The memory 210 can also include an encoding attribute measurement component 218 for measuring various attributes associated with the generation or transmission of the encoded content. For example, the encoding attribute measurement component 218 can measure or detect available or effective bandwidth experienced by the specific encoding node 124. Additionally, the memory 210 can further include an IoT core management messaging component 220 for generating and receiving IoT-messages as described herein. For example, the IoT core management messaging component 220 can be configured to publish and process MQTT-based messages in a manner that facilitates reporting measured or detected bandwidth. In another example, the IoT core management messaging component 220 can be configured to publish and process MQTT-based message in manner that facilitates modification of the encoding process according to allocated bandwidth. Still further, in some embodiments, the memory 210 can include an encoder management component 222 that can be configured to process measured or detected available or effective bandwidth experienced by a set of encoding nodes 124. The encoder management component 222 can be configured with various or multiple allocation algorithms that can consider different criteria in allocating bandwidth as described herein. The encoder management component 222 can work in conjunction with a management component 126, in conjunction with other encoder management components associated with different encoding nodes, or in lieu of a management component 126.

Figure 3:
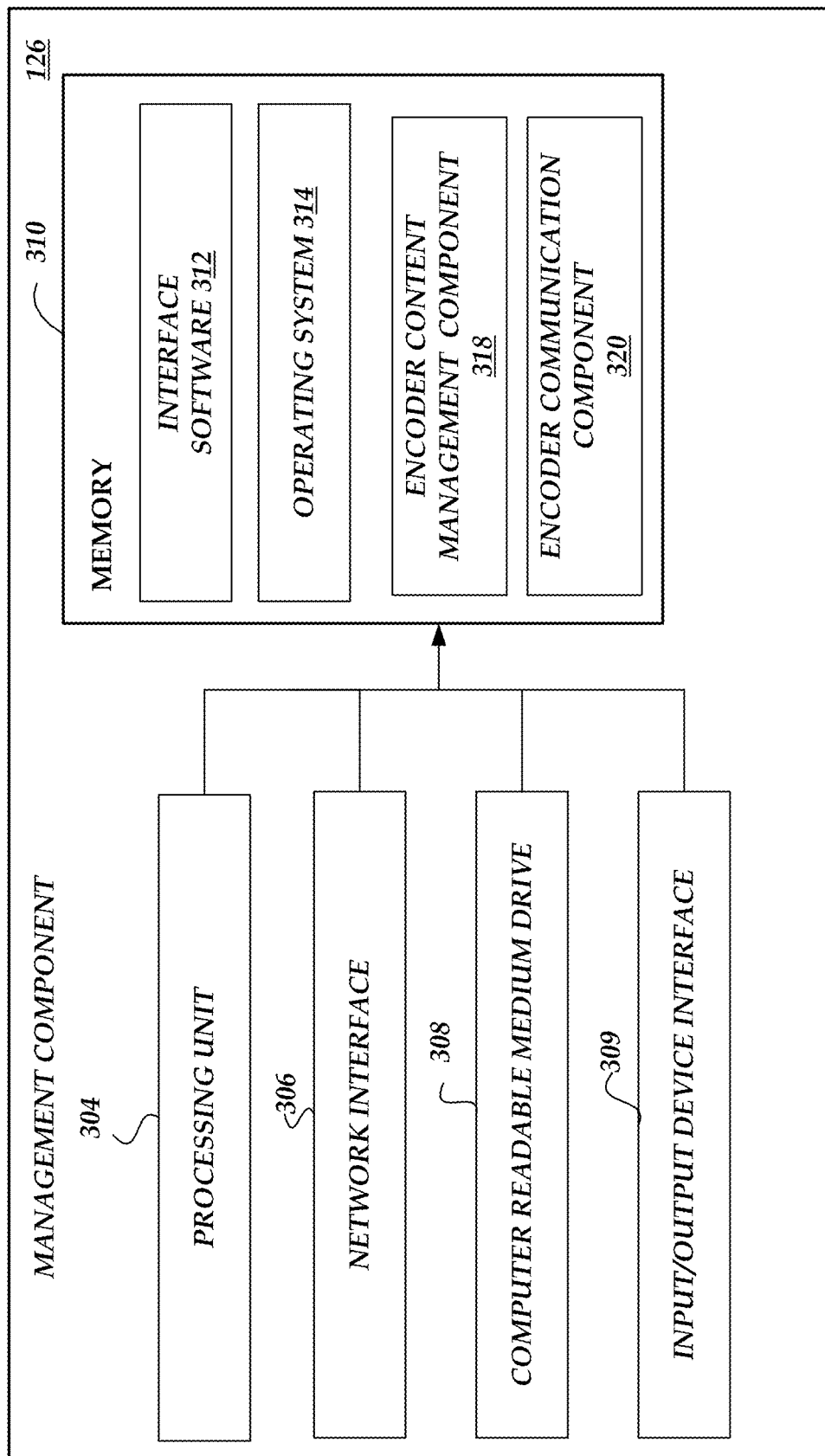
FIG. 3 is a block diagram of illustrative components of management service component configured to bandwidth allocations for a set of encoders in accordance with an illustrative embodiment.

FIG. 3 depicts one embodiment of an architecture of an illustrative management service component 126. As described above, the content delivery service 120 includes multiple egress components 124 (or nodes) that facilitate the generation of encoded content segments to be outputted by the content delivery service 120. The general architecture of the management service component 126 depicted in FIG. 3 includes an arrangement of computer hardware and software components that may be used to implement aspects of the present disclosure. As illustrated, the management service component 126 includes a processing unit 304, a network interface 306, a computer readable medium drive 308, an input/output device interface 309, all of which may communicate with one another by way of a communication bus. The components of the management service 126 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the management service component 126 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the management service component 126. The memory 310 may further include computer program instructions and other information for implementing aspects of the present disclosure. For example, in one embodiment, the memory 310 includes interface software 312 for receiving and processing content requests from requesting entities. Additionally, the memory 310 can include an encoder management component 318 that can be configured to process measured or detected available or effective bandwidth experienced by specific encoding nodes 124. The encoder management component 318 can be configured with various or multiple allocation algorithms that can consider different criteria in allocating bandwidth. Additionally, the memory 310 can further include an encoder messaging component 320 for generating and receiving IoT-messages as described herein. For example, the encoder messaging component 320 can be configured to publish and process MQTT-based messages in a manner that facilitates receiving measured or detected bandwidth. In another example, the encoder messaging component 320 can be configured to publish and process MQTT-based message in manner that facilitates transmission of allocation information to a set of encoding nodes 124 that results in the modification of the encoding process according to allocated bandwidth.

Figure 4A:
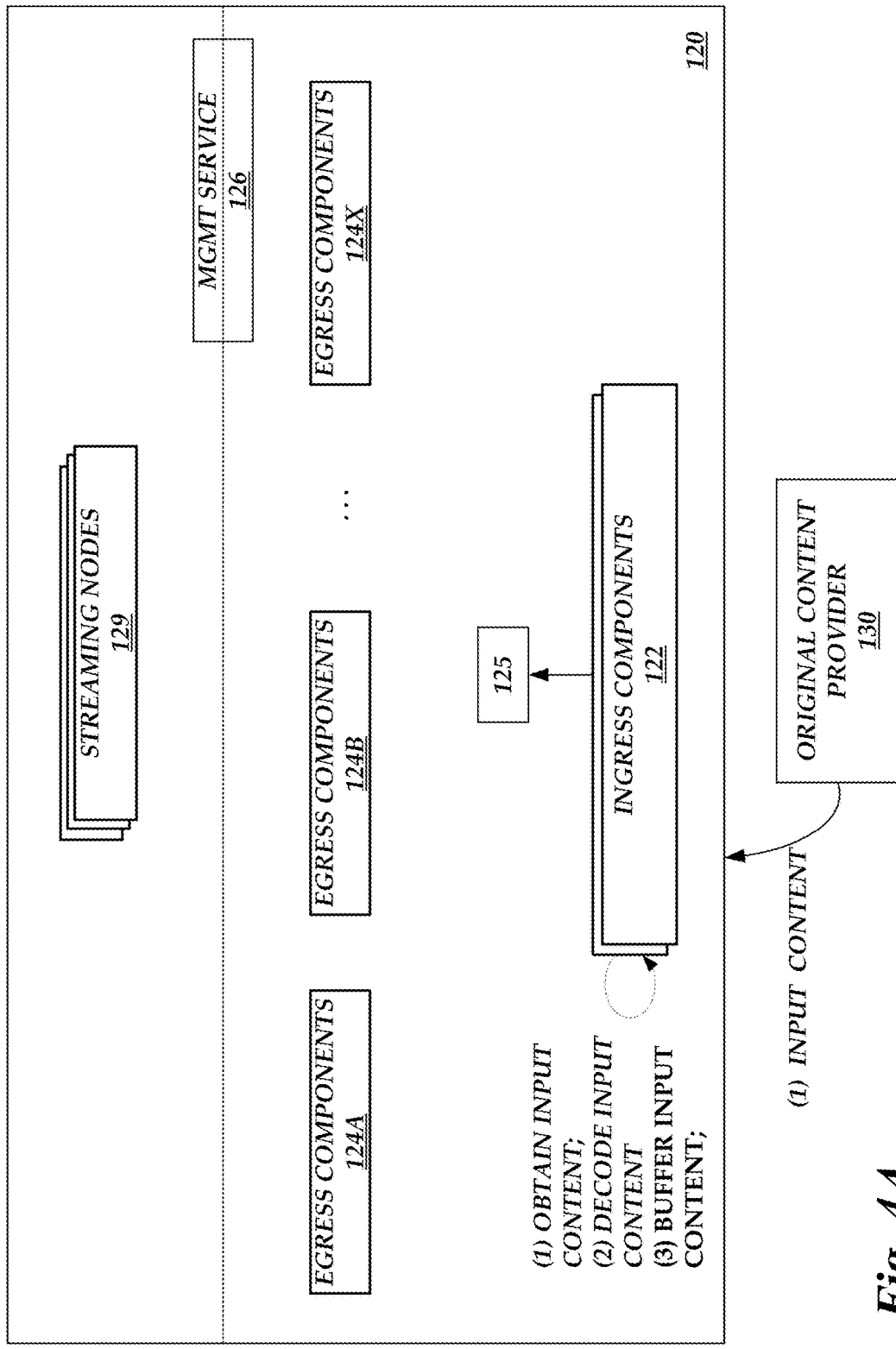

Turning now to FIGS. 4A, 4B, 4C, 4D, and 4E, an illustrative interaction for the processing of encoded content provided by the original content provider 130 will be described. FIGS. 4A-4E will be described with the receipt of a portion of a content stream from an original content provider 130. One skilled in the relevant art will appreciate that the illustrative interaction would continue/repeat for an ongoing content stream and for different original content provided the same or different original content provider 130. With reference first to FIG. 4A, at (1), the original content provider 130 transmits the original encoded content to the content delivery service 120. Illustratively, encoders can be configured with any one of a variety of encoding parameters that are specified in accordance with the encoding format. Such encoding parameters can be varied in accordance with the specifications of the format, which may result in differences in the encoded content such as size of the encoded content, quality of the encoded content, reduction of artifacts, etc. The encoding parameters can also include synchronization information, such as timestamp or sequence number information that is utilized to keep the encoded content transmitted by the content delivery service 120 synchronized. Illustratively, the format and bitrate for the encoded content corresponds to at least the highest bitrate that will be provided by the content provider service. For purposes of illustration, it is assumed that the transmission of the encoded content corresponds to a first content stream, regardless of whether the content provider 130 may have transmitted previous content streamed or switched to different content streams.

At (2), the content delivery service 120 receives and process the original encoded content from the original content provider 130. More specifically, at (2), the ingress node 122 stores the original encoded content (optional) and then decodes the original encoded content into a decoded or unencoded format for use by egress nodes 124. At (3), the content delivery service 120 buffers the encoded content into one or more cache 125 that functions as the source for the encoding nodes 124 for streaming the content. Although only a single cache 125 is illustrated in FIG. 4A, the number and type of memory utilized to make unencoded content available to the encoding nodes 124 can vary.

Figure 4B:
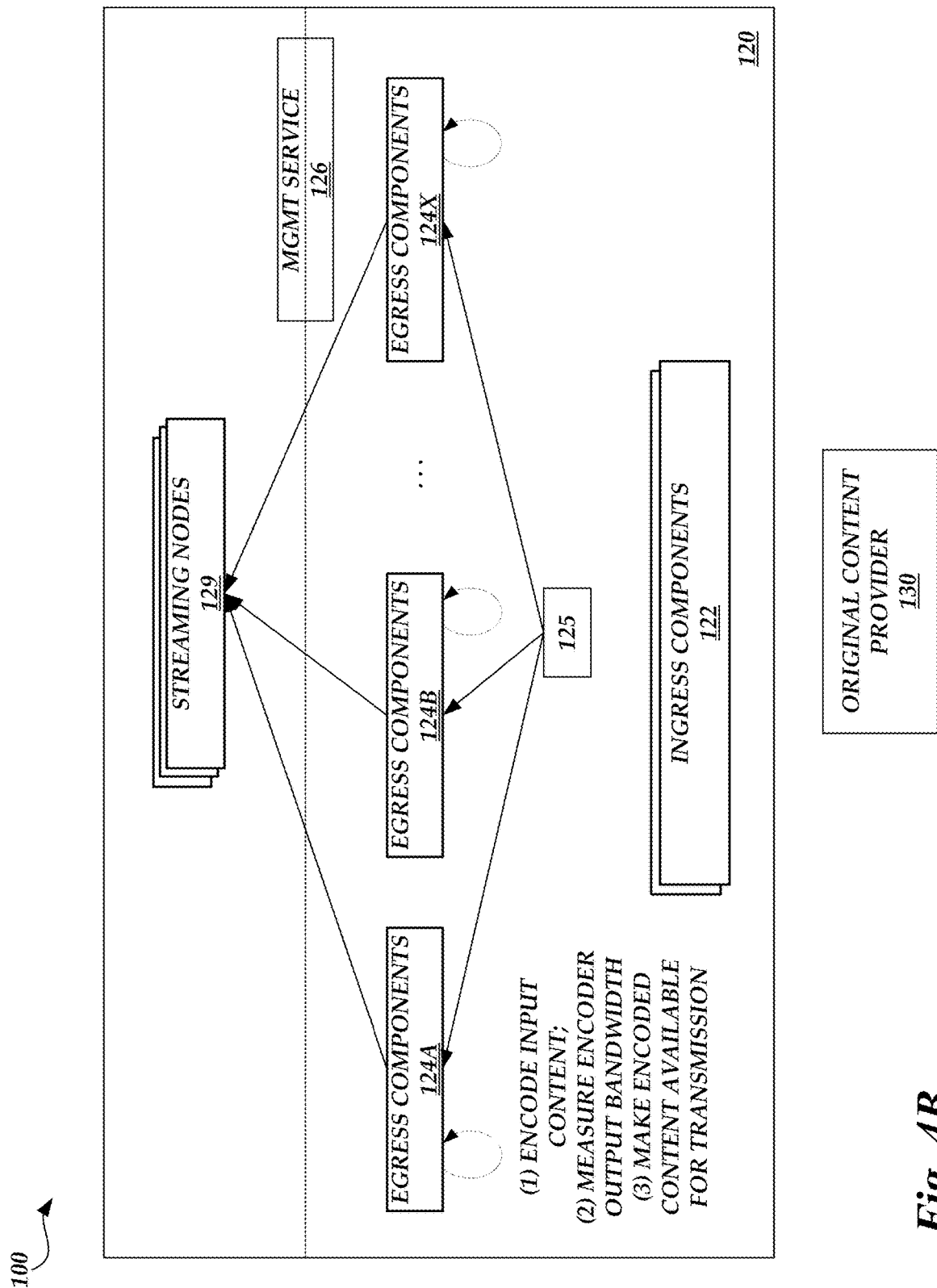

With reference now to FIG. 4B, at (1), a set of encoding nodes 124A, 124B, . . . 124X accesses unencoded content and encodes the input content. Depending on the various embodiments described herein, subsets of the encoding nodes 124A, 124B, . . . 124X can access the same unencoded content or different unencoded content. Accordingly, the present application should not be limited to requiring accessing the same or different unencoded content unless specified. Illustratively, the encoding nodes 124A, 124B, . . . 124X can generate one or more encoded input content streams according to one or more bitrate and format combinations. For purposes of aspects of the present application, the specific bitrate or format of the encoded content may vary. For example, in one embodiment, two or more encoding nodes 124 can access the same unencoded content and generate encoded content according to different bitrate/format combinations. In another embodiment, two or more encoding nodes 124 can access the same unencoded content and generate encoded content according to the same (or substantially similar) bitrate/format combination (e.g., redundant or duplicative encoding). In still other embodiments, two or more encoding nodes 124 can access different unencoded content and generate encoded content according the same or different encoding bitrate/formats. As will be described in greater detail below, in some embodiments, encoding nodes 124 generating encoded content according to a higher bitrate/format combination, such as a 4K or 8K format, may generate encoded content that is large in size or that may be considered premium content relative to lower bitrate/format combinations, such as a 740 p.

At (2), the individual encoding nodes 124 can measure the amount of available bandwidth that is available between the individual encoding node and the recipient of the encoded content, such as the streaming nodes 129 (or some interface point). Illustratively, the encoding nodes 124 and streaming nodes 129 can include various network components, such as network address translators, routers, etc. that facilitate the transmission of encoded content according to data communication protocols. Accordingly, the individual nodes 124 can utilize the communication protocols, or other protocols, to measure the effective data rate or throughput of encoded content. At (3), the content delivery service 120 makes the input content available for transmission by providing the encoded input content to the streaming nodes 129. Although FIG. 4B is illustrated as the encoding node 124 measuring bandwidth attributes and making the encoded content available, one skilled in the relevant art will appreciate that measurement of the bandwidth attributes may occur simultaneously, or in conjunction, with the transmission of the encoded content stream by the encoding node 124.

Figure 4C:
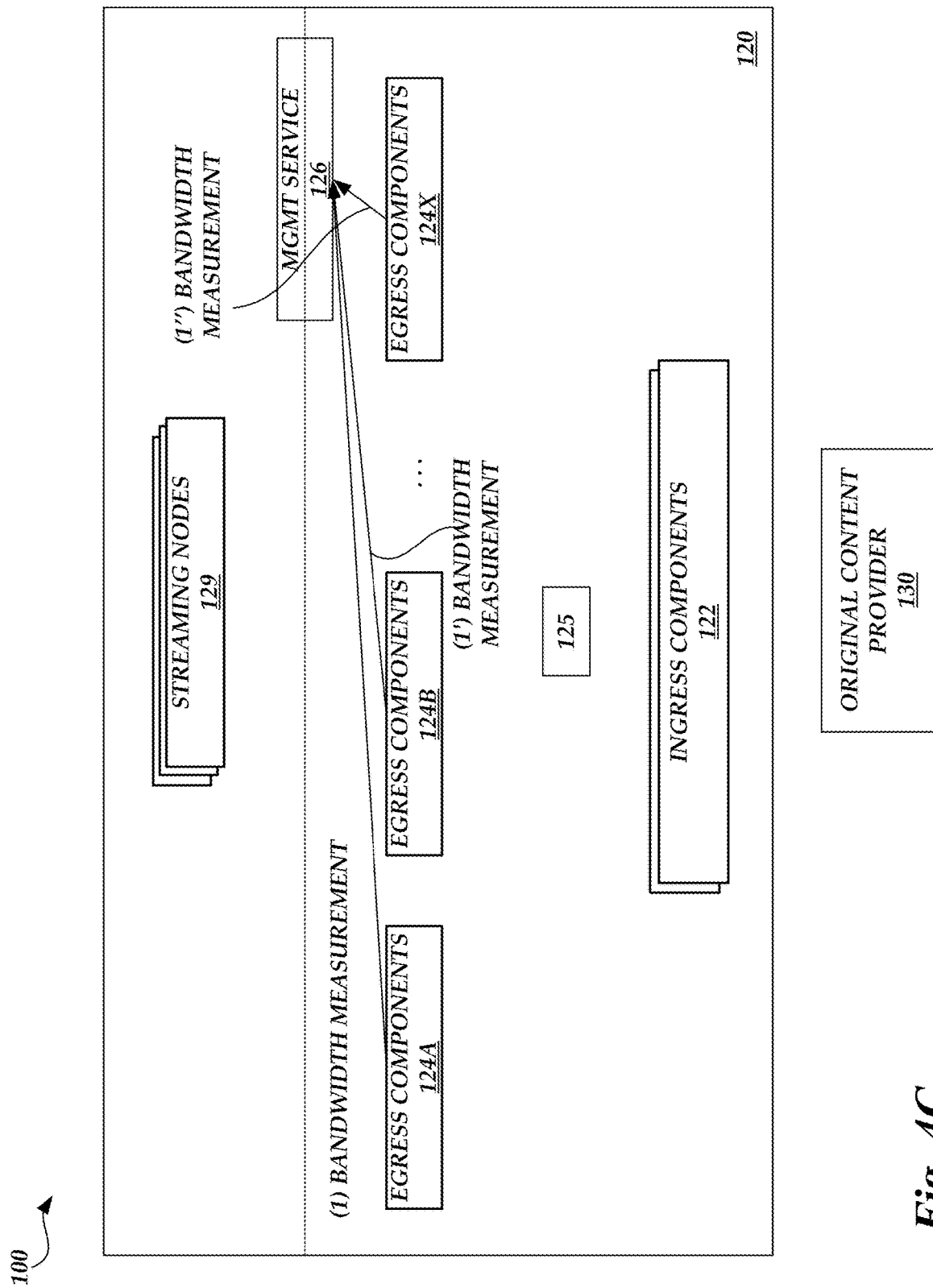

With reference now to FIG. 4C, in some embodiments, the individual encoding nodes 124 transmit the collected or measured bandwidth attributes to the management service 126. Illustratively, the collected or measured bandwidth attributes can correspond to measurements of actual bandwidth available to the individual encoding node 124. In other embodiments, the collected or measured bandwidth attributes can include error rates, performance information, throughput, etc. that can be processed in a manner to estimate or characterize available bandwidth. As described above, the individual encoding nodes can be configured to publish and process MQTT-based messages in a manner that facilitates reporting measured or detected bandwidth. More specifically, in one embodiment, MQTT-based messages are topic-based messages in which individual messages are associated solely with a topic and data payload but do not include any routing or addressing information. For example, MQTT-based messages do not include any information directly identifying an intended recipient of the message, such as specific network identifiers, network addresses and the like. This allows the sending components (e.g., the encoding nodes 124) to have less complex configurations for receiving or transmitting messages.

With continued reference to an MQTT-based example, additional network components receive the published messages from the senders and then forward the messages to recipient devices that have registered to receive messages published according to one or more topics. The network component can validate the recipients and transmit messages as they are received or in batch form. As applied to FIG. 4C, the management service 126 can be configured to receive MQTT-based messages from a set of encoder nodes 124 by registering to receive MQTT-based messages published according to one or more topics used by the encoding nodes 124. The network component that acts as the intermediary can illustratively be a specially configured stand-alone component (e.g., a dedicated intermediary component) or can correspond to any previously discussed component of the content delivery service 120 that can be configured to apply the functionality. In some embodiments, the set of encoding nodes 124 may utilize the same topic to publish message with the measured or detected bandwidth attributes. In other embodiments, individual encoding nodes of the set of encoding nodes 124 or subsets of the encoding nodes 124 can utilize different topics that can provide the management service 124 with additional identification information regarding the source or type of bandwidth measurement information. For example, encoding nodes 124 from different physical regions may utilize different topics indicative of the physical region location of the encoding node, such as "Region 1", "Region 2", etc.

Figure 4D:
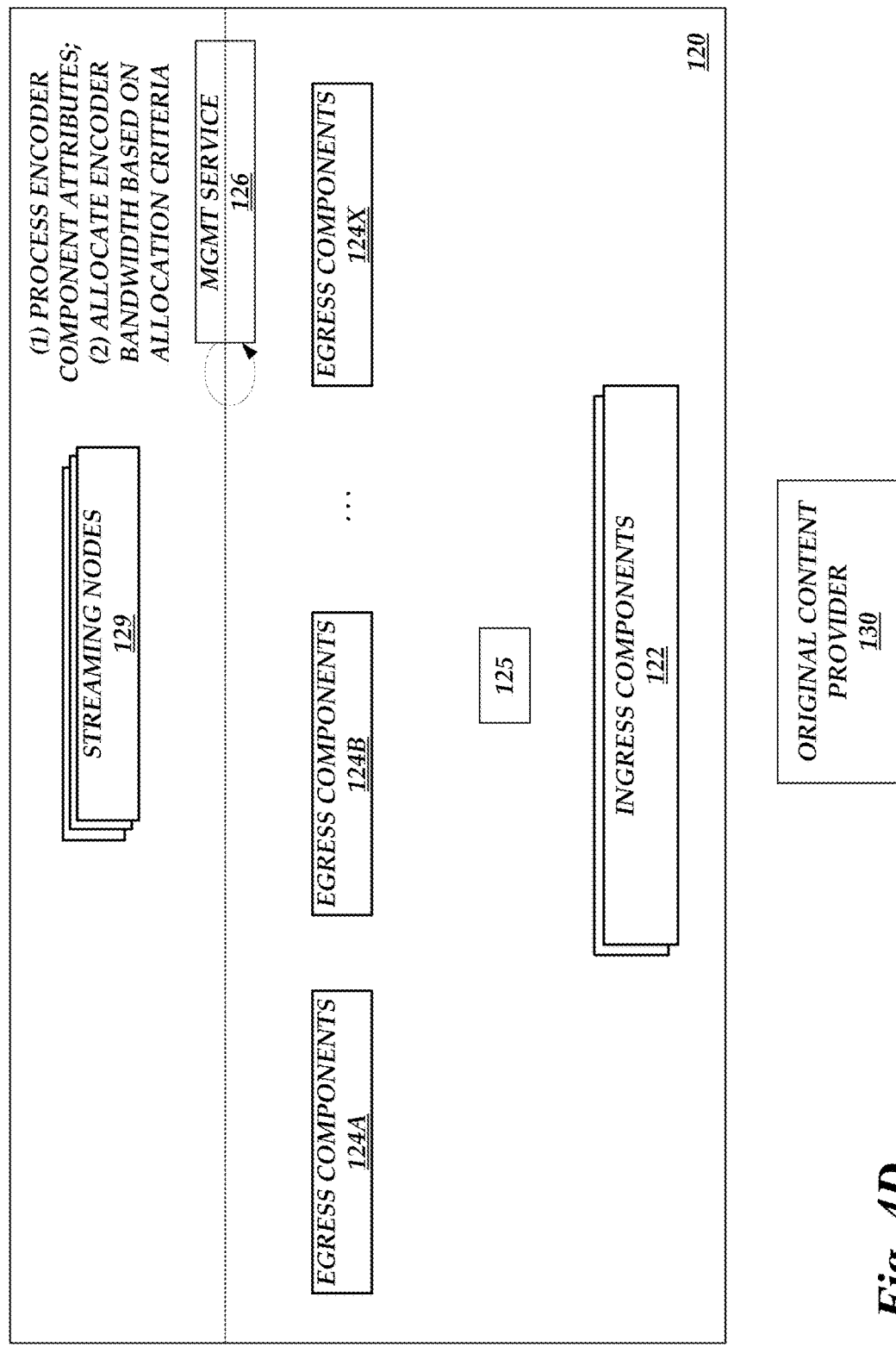

With reference now to FIG. 4D, after receiving the bandwidth attribute information from the encoding nodes 124, at (1), the management service 126 processes the encoder component attributes. In one aspect, the management service 126 can first determine a total available bandwidth. In accordance with this aspect, the management service 126 can first group or identify encoding nodes 124 that share a common transmission network. For example, the management service 126 can determine encoding nodes 124 that are associated with common networking equipment, such as a NAT, that is indicative of a shared bandwidth scenario. In other examples, the encoding nodes 124 may be preconfigured with such identification information, such as by published topic in an MQTT-based protocol transmission.

In another aspect, the management service 126 can then calculate the available bandwidth as a sum of the received bandwidth measurements. In one example, the management service 126 can sum all the received measurements to determine the available bandwidth. If the received bandwidth information corresponds to indirectly measured bandwidth attributes (e.g., error rates), the management service 126 can further process the indirectly measured bandwidth attribute information to arrive at bandwidth estimates. In another example, the management service 126 can utilize averaged measurement amounts for the individual encoding nodes and sum averaged measured bandwidth. In still another example, the management service 126 can sum the received measured bandwidths and normalize the summed bandwidths based on historical information, such as previously calculated available bandwidths or averaged available bandwidths. Still further, the management service 126 can also supplement previously calculated bandwidth estimates to validate or update previous individual or cumulative bandwidth estimates.

In still a further aspect, the management service 126 can then further process the determined available bandwidth. For example, the management service 126 can reduce the calculated available bandwidth by a factor or by a set amount. The factor may be determined based on errors associated with previous calculations (e.g., over estimation errors), performance selection, current or historical error rates, customer preferences, customer types, current or historical user request loads, and the like. In this example, the management service 126 may reserve bandwidth by reducing the available bandwidth in scenarios in which the number of requesting users is lower or in which the number or complexity of the encoding process is relatively lower. In another example, the management service 126 can increase the calculated available bandwidth by a factor or by a set amount. The factor may be determined based on historical measured available bandwidth, error rates associated with previous calculations (e.g., under estimation errors), missing data from one or more encoding nodes 124, and the like.

At (2), the management service 126 then allocates the determined available encoder bandwidth based on allocation criteria. Illustratively, the management service 126 can consider various criteria in determining how the determined (and processed) available encoder bandwidth is allocated. In one aspect, the management service 126 can utilize a load balancing approach or algorithm in which all the identified encoding nodes are attributed with a ratio or share of the determined available encoder bandwidth. In the simplest embodiment, the management service 126 can divide the determined available encoder bandwidth equally among the identified encoding nodes and allocate each encoding node 124 equal bandwidth. In another embodiment, the determined available encoder bandwidth can make unequal allocations based on prioritization information. For example, the management service 126 can prioritize encoder nodes that encode content from specific original content providers 130 or that have an identified content type (e.g., live sporting events), or that are associated with some form of prioritization identifier. Still further, in some embodiments, the content type may be variable over streaming, such that content streams will have different priorities based on the type of content being depictured. For example, a content stream for a live sporting event may have an increased priority when depicting the actual sporting event, but may reduce the priority during intermissions, stoppage in play, commentary, commercials, and the like. In this embodiment, the management service 126 can utilize multipliers that allocate additional bandwidth to encoders as a percentage of determined bandwidth need or allocation. In one example, the management service 126 can allocate bandwidth as a percentage of individual bandwidth over a cumulative bandwidth need for the set of encoder nodes (e.g., a linear distribution). In another example, a content with a higher priority can be associated with a multiplier above one (e.g., 1.1×) that may not be a purely linear mapping. Content with the highest priority can be associated with a larger multiplier (e.g., 1.5×). In other example, content with lower priorities can be associated with multipliers below one (e.g., 0.90×). In this embodiment, the management service 126 can alternatively utilize preset templates of allocated bandwidth based on historical information or pre-configuration.

In still another embodiment, the determined available encoder bandwidth can make unequal allocations based on other information such as content delivery service provider performance information. In this embodiment, the management service 126 may apply an adjustment factor or otherwise adjust allocated bandwidth based on determined performance of the encoding nodes 124. For example, the management service 126 may allocate additional bandwidth to encoders experiencing error conditions or lossy conditions that require additional or supplemental transmissions. Such adjustment factors can include one or more variations of the adjustments described above with regard to prioritization criteria. In another example, the management service 126 may allocate less bandwidth to encoders that have experienced sufficient errors (e.g., an error rate above a threshold) that corresponds to at least a deallocation of bandwidth to an encoder that is predicted to fail or that will not likely meet quality metrics.

In still another embodiment, the determined available encoder bandwidth can make unequal allocations based on other information such as content delivery service provider financial information. In this embodiment, the management service 126 may apply an adjustment factor or otherwise adjust allocated bandwidth based on determined an attributed financial cost or financial gain associated with the encoding nodes 124 or content provided by the encoding nodes. For example, the management service 126 may allocate additional bandwidth to encoders generating encoded content that is considered or designated as premium content and that may have a calculated higher rate of return for the content delivery service 120. Such designation may be provided by the original content provider 130 or the content delivery service 120.

In still further embodiments, the determined available encoder bandwidth can make unequal allocations based on configuration of the encoders 124. In this embodiment, as described above, a set of encoding nodes 124 can be configured to encoded content according the same bitrate/format combination. In this regard, the encoded content from the set of encoding nodes 124 can be considered redundant or duplicative. Additionally, at least one of the encoding nodes 124 can be considered a primary source of the encoded content, while additional encoding nodes can be considered secondary or backup sources of the encoded content. In some examples, the additional encoding nodes can be further broken down into different tiers or levels of backup/redundancy (e.g., primary, secondary, tertiary, and the like). Illustratively, the designated role(s) of the encoder nodes may be specified by the original content provider 130, such as via a meta-data in the encoding content or via manual designation. In other embodiments, the designated role of the encoder may be inferred based on processing the encoded content streams. For example, the management service (or other component) can compare encoded content streams from multiple encoders and identify redundant content, such as by matching frame data. The management service 126 can then associate, characterize or validate designated roles for the set of encoders 124. Accordingly, the management service 126 may apply an adjustment factor or otherwise adjust allocated bandwidth based on a designated role of the encoding nodes 124. For example, the management service 126 may allocate additional bandwidth to encoders that are considered primary sources of the encoded content to ensure that the encoded content is delivered with less errors, time lag, and the like. The management service 126 can also adjust the bandwidth allocation to secondary sources downward. The management service 126 can then allocates the available bandwidth based on the attributes of the format including resolution, frame rate, color depth, codec, chroma sampling and the complexity of the video segment. In some embodiments, the bandwidth allocation may be dynamic such that the secondary source bandwidth allocation can be reduced based on current network conditions, performance of the primary source, predicted failure of the primary source, and the like. Such adjustment factors can include one or more variations of the adjustments described above with regard to prioritization criteria. Additionally, in additional embodiments, the management service 126 can further consider at least a portion of additional selection criteria as described above, such as prioritization criteria, to consider additional adjustments or adjustments in combination. For example, the management service 126 can make cumulative adjustments corresponding to an adjustment attributable to the designated role and an adjustment attributable to the evaluation of the additional selection criteria. In another example, the management service 126 can select only one of the adjustments, such as the greatest adjustment or the least adjustment. In still another example, the management service 126 can take an average adjustment or some statistical processing of multiple adjustments.

In yet further embodiments, the determined available encoder bandwidth can make unequal allocations based on differences in configuration of the encoders 124. In this embodiment, as described above, a set of encoding nodes 124 can be configured to encoded content according the different bitrate/format combination. In this regard, the encoded content from the set of encoding nodes 124 can be considered either as part of ABR (e.g., same content, different bitrate/format) or two different content streams. Illustratively, content with a higher bitrate/format combination would consume greater bandwidth in transmission. The designation of differences in encoding can be associated with specific bitrate/format combinations or according to categories of bitrate/format combinations. For example, the configurations may be associated with one of three classes of bitrate/format combination (e.g., "low resolution encoding", "standard resolution encoding", and "high resolution encoding." Accordingly, the management service 126 may apply an adjustment factor or otherwise adjust allocated bandwidth based on the configuration information of the encoding nodes 124. For example, the management service 126 may allocate additional bandwidth to encoders that are configuration with a higher bitrate resolution of encoded content to ensure that the encoded content is delivered with less errors, time lag, and the like. In another example, the management service 126 may allocate additional bandwidth to encoders that are configuration with a higher color formatting or color resolution of encoded content to ensure that the encoded content is delivered with less errors, time lag, and the like. The management service 126 can also adjust the bandwidth allocation to lower resolution downward. In some embodiments, the bandwidth allocation may also be dynamic such that the lower resolution encoding bandwidth allocation can be reduced based on current network conditions, performance of the encoders, predicted failure of the encoders, and the like. Such adjustment factors can include one or more variations of the adjustments described above with regard to prioritization criteria. Additionally, in additional embodiments, the management service 126 can further consider at least a portion of additional selection criteria as described above, such as prioritization criteria, to consider additional adjustments or adjustments in combination. For example, the management service 126 can make cumulative adjustments corresponding to an adjustment attributable to the determined configuration and an adjustment attributable to the evaluation of the additional selection criteria. In another example, the management service 126 can select only one of the adjustments, such as the greatest adjustment or the least adjustment. In still another example, the management service 126 can take an average adjustment or some statistical processing of multiple adjustments.

Turning now to FIG. 4E, in some embodiments, the management service 126 can transmit the allocated bandwidth or other control instructions to one or more individual encoding nodes 124. As described above, the individual encoding nodes 124 and the management service 126 can be configured to publish and process MQTT-based messages in a manner that facilitates reporting measured or detected bandwidth. More specifically, in one embodiment, MQTT-based messages are topic-based messages in which individual messages are associated solely with a topic and data payload but do not include any routing or addressing information. For example, MQTT-based messages do not include any information directly identifying an intended recipient of the message, such as specific network identifiers, network addresses and the like. This allows the sending components (e.g., the management service 126 or an encoding node configured with the management service functionality) to have less complex configurations for receiving or transmitting messages.

With continued reference to an MQTT-based example, additional network components receive the published messages from the senders and then forward the messages to recipient devices that have registered to receive messages published according to one or more topics. The network component can validate the recipients and transmit messages as they are received or in batch form. As applied to FIG. 4E, the management service 126 can be configured to transmit MQTT-based messages to a set of encoder nodes 124 that have registered to receive MQTT-based messages published according to one or more topics. used by the encoding nodes 124. As previously described, the network component that acts as the intermediary can illustratively be a specially configured stand-alone component (e.g., a dedicated intermediary component) or can correspond to any previously discussed component of the content delivery service 120 that can be configured to apply the functionality. For example, an encoding node 124 may be configured with additional logic or functionality to implement intermediary functionality.

In some embodiments, the management service 126 may utilize a common topic to publish message with the attributed bandwidth or other control instructions. In such embodiments, individual encoding nodes of the set of encoding nodes 124 or subsets of the encoding nodes 124 can be configured to filter or process topics that correspond to the subsets of encoding nodes 124. In other embodiments, the management service 126 can utilize different topics for individual encoding nodes or set of encoding nodes 124. In still other embodiments, the management service 126 can publish topics based on the type of configuration information. For example, the management service 126 can publish topics based on "Bandwidth Allocation", "Alert", "Device Status", or other customized communication. Illustratively, the receiving nodes 124 can process the messages and implement the configuration, such as by adjusting the output of the encoding node.

Figure 4F:
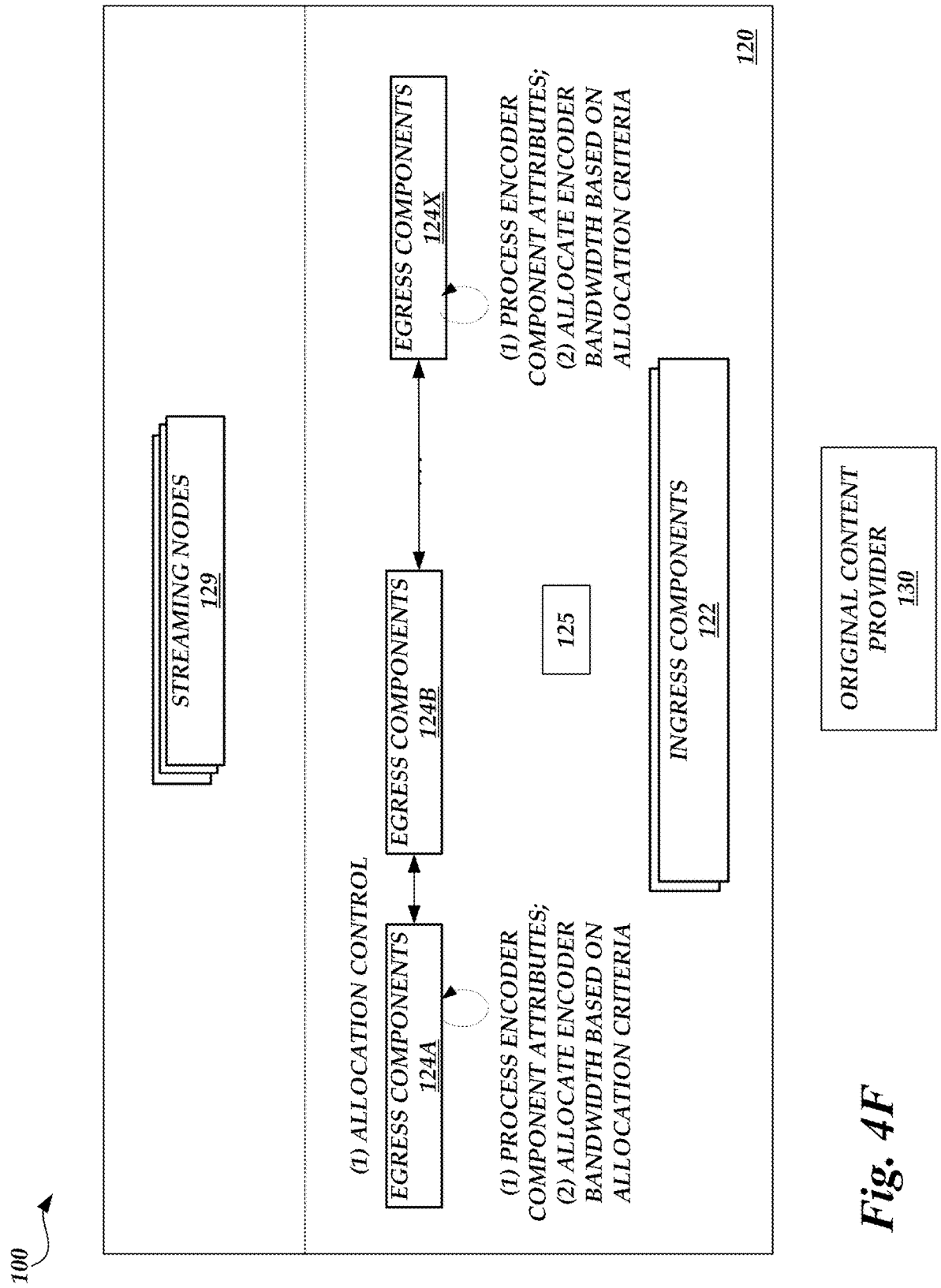

With reference now to FIG. 4F, in one embodiment, the management service 126 may be omitted (or considered redundant). In this embodiment, one or more encoding nodes can be configured with encoder management components (FIG. 2) to facilitate implementation of at least some portion of the functionality previously associated with the management service 126. As illustrated in FIG. 4F, the set of encoding nodes 124A, 124B and 124X can exchange bandwidth measurement information, such as using an IoT-based communication protocol (e.g., MQTT) and as discussed above with regard to FIG. 4C. As further illustrated in FIG. 4F, encoders 124A and 124X can work in concert or in parallel to process the encoder component attributes at (1) and allocate encoder bandwidth based on allocation criteria at (2). In this regard, the individual encoders 124A and 124X may implement any or all of the examples and embodiments described with regard to the management component 126 in FIG. 4D. Thereafter, the encoding nodes 124A, 124B and 124X can exchange encoding allocation information such as using an IoT-based communication protocol (e.g., MQTT) and as discussed above with regard to FIG. 4E.

Figure 5:
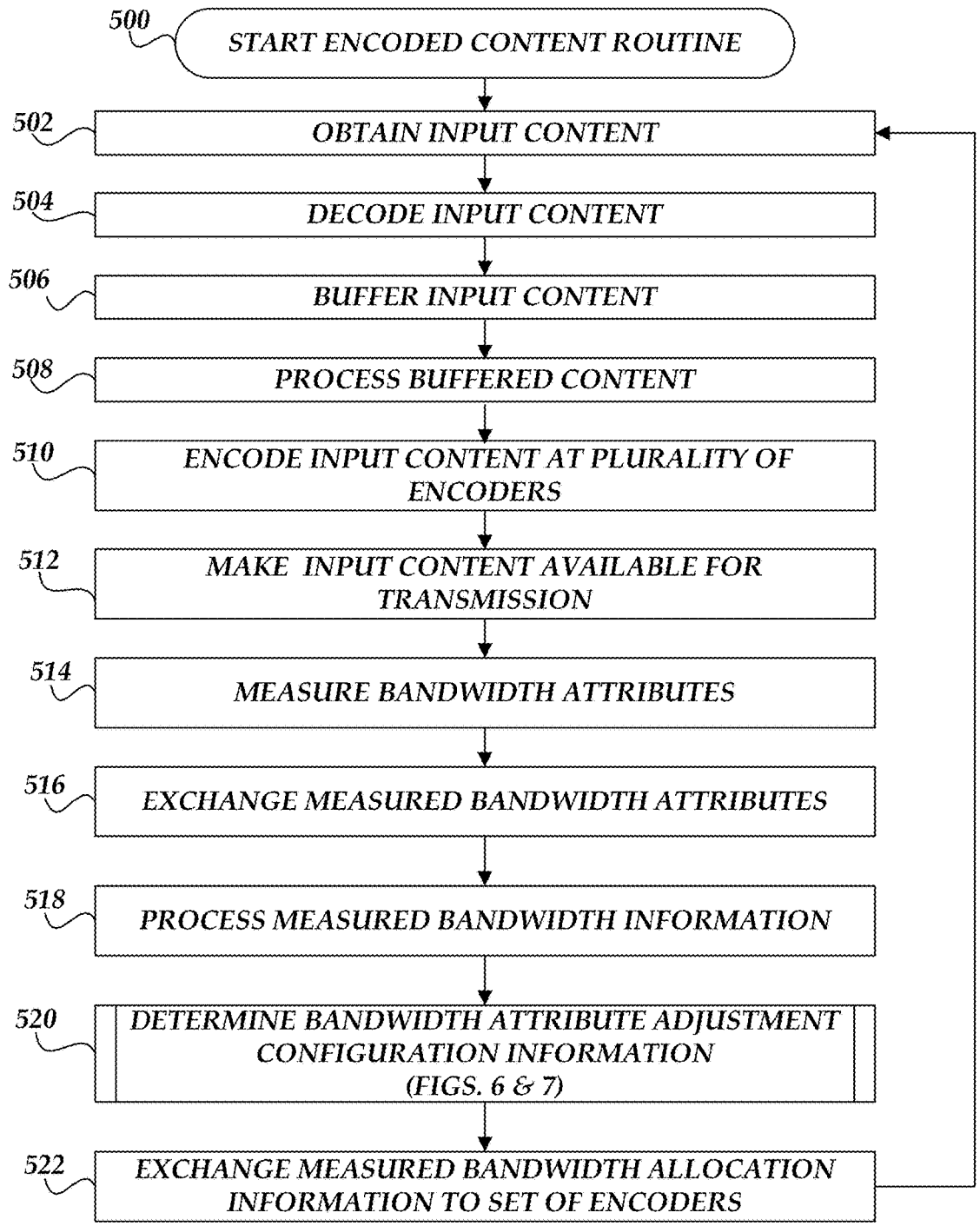
FIG. 5 is a flow diagram illustrative of an encoded content processing routine implemented by a content delivery service in accordance with an illustrative embodiment.

Turning now to FIG. 5, a routine 500 utilized by the content delivery service 120 for managing the generation of embedded content streams will be described. Illustratively, routine 500 may be implemented by the management service 126 or other similar configured component of the content delivery service 120 once the original content provider 130 begins transmitting encoded content streams to the content delivery service 120. Accordingly, although routine 500 is described with regard to implementation by a management service 126, aspects can be implemented by encoding nodes 124 configured with additional functionality.

At block 502, the content delivery 120 obtains input content. At block 504, The egress node 122 decodes the input content according to specified parameters. At block 506, the received input content is buffered. At 508, the content delivery service 120 process the input content. At block 510, the egress node 124 obtains instructions to generate encoded content. As described above, illustratively, the content delivery service 120 can determine the encoding profiles that will be utilized to generate multiple encoded versions of the original content. The encoding profile parameters can include synchronization information, such as timestamp or sequence number information that is utilized to keep the encoded content transmitted by the content delivery service 120 synchronized. As described above, depending on the various embodiments described herein, subsets of the encoding nodes 124A, 124B, . . . 124X can access the same unencoded content or different unencoded content. Accordingly, the present application should not be limited to requiring accessing the same or different unencoded content unless specified. Illustratively, the encoding nodes 124A, 124B, . . . 124X can generate one or more encoded input content streams according to one or more bitrate and format combinations. For purposes of aspects of the present application, the specific bitrate or format of the encoded content may vary. For example, in one embodiment, two or more encoding nodes 124 can access the same unencoded content and generate encoded content according to different bitrate/format combinations. In another embodiment, two or more encoding nodes 124 can access the same unencoded content and generate encoded content according to the same (or substantially similar) bitrate/format combination (e.g., redundant or duplicative encoding). In still other embodiments, two or more encoding nodes 124 can access different unencoded content and generate encoded content according the same or different encoding bitrate/formats. As will be described in greater detail below, in some embodiments, encoding nodes 124 generating encoded content according to a higher bitrate/format combination, such as a 4K or 8K format, may generate encoded content that is large in size or that may be considered premium content relative to lower bitrate/format combinations, such as a 740 p.

At block 512, the egress node 124 makes the content available for transmission by providing the encoded input content to the streaming nodes 129. Illustratively, the buffered content in the first channel is sufficient to allow the input content to be generated by the egress nodes 124 at a rate that does not create disruptions in the eventual transmission of the content stream to the user devices 102.

Turning now to blocks 514-522, the various encoding nodes of the content delivery service 120 can then continue to stream the first content channel until block 514, when the content delivery service 120 can make adjustments to the allocated bandwidth for the set of encoders sharing network connectivity. At block 514, the individual encoding nodes 124 can measure the amount of available bandwidth that is available between the individual encoding node and the recipient of the encoded content, such as the streaming nodes 129 (or some interface point). Illustratively, the encoding nodes 124 and streaming nodes 129 can include various network components, such as network address translators, routers, etc. that facilitate the transmission of encoded content according to data communication protocols. Accordingly, the individual nodes 124 can utilize the communication protocols, or other protocols, to measure the effective data rate or throughput of encoded content. At (3), the content delivery service 120 makes the input content available for transmission by providing the encoded input content to the streaming nodes 129. Although FIG. 4B is illustrated as the encoding node 124 measuring bandwidth attributes and making the encoded content available, one skilled in the relevant art will appreciate that measurement of the bandwidth attributes may occur simultaneously, or in conjunction, with the transmission of the encoded content stream by the encoding node 124.

At block 516, the individual encoding nodes 124 transmit the collected or measured bandwidth attributes to the management service 126. Such information can illustrative include direct measurements of available bandwidth (e.g., an agent or component configured to calculate bandwidth) or indirect measurements of available bandwidth (e.g., error rates). As described above, the individual encoding nodes can be configured to publish and process MQTT-based messages in a manner that facilitates reporting measured or detected bandwidth. More specifically, in one embodiment, MQTT-based messages are topic-based messages in which individual messages are associated solely with a topic and data payload but do not include any routing or addressing information. For example, MQTT-based messages do not include any information directly identifying an intended recipient of the message, such as specific network identifiers, network addresses and the like. This allows the sending components (e.g., the encoding nodes 124) to have less complex configurations for receiving or transmitting messages.

With continued reference to an MQTT-based example, additional network components receive the published messages from the senders and then forward the messages to recipient devices that have registered to receive messages published according to one or more topics. The network component can validate the recipients and transmit messages as they are received or in batch form. Illustratively (as illustrated in FIG. 4C), the management service 126 can be configured to receive MQTT-based messages from a set of encoder nodes 124 by registering to receive MQTT-based messages published according to one or more topics used by the encoding nodes 124. The network component that acts as the intermediary can illustratively be a specially configured stand-alone component (e.g., a dedicated intermediary component) or can correspond to any previously discussed component of the content delivery service 120 that can be configured to apply the functionality. In some embodiments, the set of encoding nodes 124 may utilize the same topic to publish message with the measured or detected bandwidth attributes. In other embodiments, individual encoding nodes of the set of encoding nodes 124 or subsets of the encoding nodes 124 can utilize different topics that can provide the management service 124 with additional identification information regarding the source or type of bandwidth measurement information. For example, encoding nodes 124 from different physical regions may utilize different topics indicative of the physical region location of the encoding node, such as "Region 1", "Region 2", etc.

At block 518, after receiving the bandwidth attribute information from the encoding nodes 124, the management service 126 processes the encoder component attributes. In one aspect, the management service 126 can first determine a total available bandwidth. In accordance with this aspect, the management service 126 can first group or identify encoding nodes 124 that share a common transmission network. For example, the management service 126 can determine encoding nodes 124 that are associated with common networking equipment, such as a NAT, that is indicative of a shared bandwidth scenario. In other examples, the encoding nodes 124 may be preconfigured with such identification information, such as by published topic in an MQTT-based protocol transmission.

In another aspect, the management service 126 can then calculate the available bandwidth as a sum of the received bandwidth measurements. In one example, the management service 126 can sum all the received measurements to determine the available bandwidth. In another example, the management service 126 can utilize averaged measurement amounts for the individual encoding nodes and sum averaged measured bandwidth. In still another example, the management service 126 can sum the received measured bandwidths and normalize the summed bandwidths based on historical information, such as previously calculated available bandwidths or averaged available bandwidths.

In still a further aspect, the management service 126 can then further process the determined available bandwidth. For example, the management service 126 can reduce the calculated available bandwidth by a factor or by a set amount. The factor may be determined based on errors associated with previous calculations (e.g., over estimation errors), performance selection, current or historical error rates, customer preferences, customer types, current or historical user request loads, and the like. In this example, the management service 126 may reserve bandwidth by reducing the available bandwidth in scenarios in which the number of requesting users is lower or in which the number or complexity of the encoding process is relatively lower. In another example, the management service 126 can increase the calculated available bandwidth by a factor or by a set amount. The factor may be determined based on historical measured available bandwidth, error rates associated with previous calculations (e.g., under estimation errors), missing data from one or more encoding nodes 124, and the like.

At block 520, the management service 126 then allocates the determined available encoder bandwidth based on allocation criteria. Illustratively, the management service 126 can consider various criteria in determining how the determined (and processed) available encoder bandwidth is allocated. In one aspect, the management service 126 can utilize a load balancing approach or algorithm in which all the identified encoding nodes are attributed with a ratio or share of the determined available encoder bandwidth. In the simplest embodiment, the management service 126 can divide the determined available encoder bandwidth equally among the identified encoding nodes and allocate each encoding node 124 equal bandwidth. In another embodiment, the determined available encoder bandwidth can make unequal allocations based on prioritization information. For example, the management service 126 can prioritize encoder nodes that encode content from specific original content providers 130 or that have an identified content type (e.g., live sporting events), or that are associated with some form of prioritization identifier. In this embodiment, the management service 126 can utilize multipliers that allocate additional bandwidth to encoders as a percentage. For example, a content with a higher priority can be associated with a multiplier above one (e.g., 1.1×). Content with the highest priority can be associated with a larger multiplier (e.g., 1.5×). In other example, content with lower priorities can be associated with multipliers below one (e.g., 0.90×). In this embodiment, the management service 126 can alternatively utilize preset templates of allocated bandwidth based on historical information or pre-configuration.

In still another embodiment, the determined available encoder bandwidth can make unequal allocations based on other information such as content delivery service provider performance information. In this embodiment, the management service 126 may apply an adjustment factor or otherwise adjust allocated bandwidth based on determined performance of the encoding nodes 124. For example, the management service 126 may allocate additional bandwidth to encoders experiencing error conditions or lossy conditions that require additional or supplemental transmissions.

Such adjustment factors can include one or more variations of the adjustments described above with regard to prioritization criteria.

In still another embodiment, the determined available encoder bandwidth can make unequal allocations based on other information such as content delivery service provider financial information. In this embodiment, the management service 126 may apply an adjustment factor or otherwise adjust allocated bandwidth based on determined an attributed financial cost or financial gain associated with the encoding nodes 124 or content provided by the encoding nodes. For example, the management service 126 may allocate additional bandwidth to encoders generating encoded content that is considered or designated as premium content and that may have a calculated higher rate of return for the content delivery service 120. Such designation may be provided by the original content provider 130 or the content delivery service 120.

Figure 6:
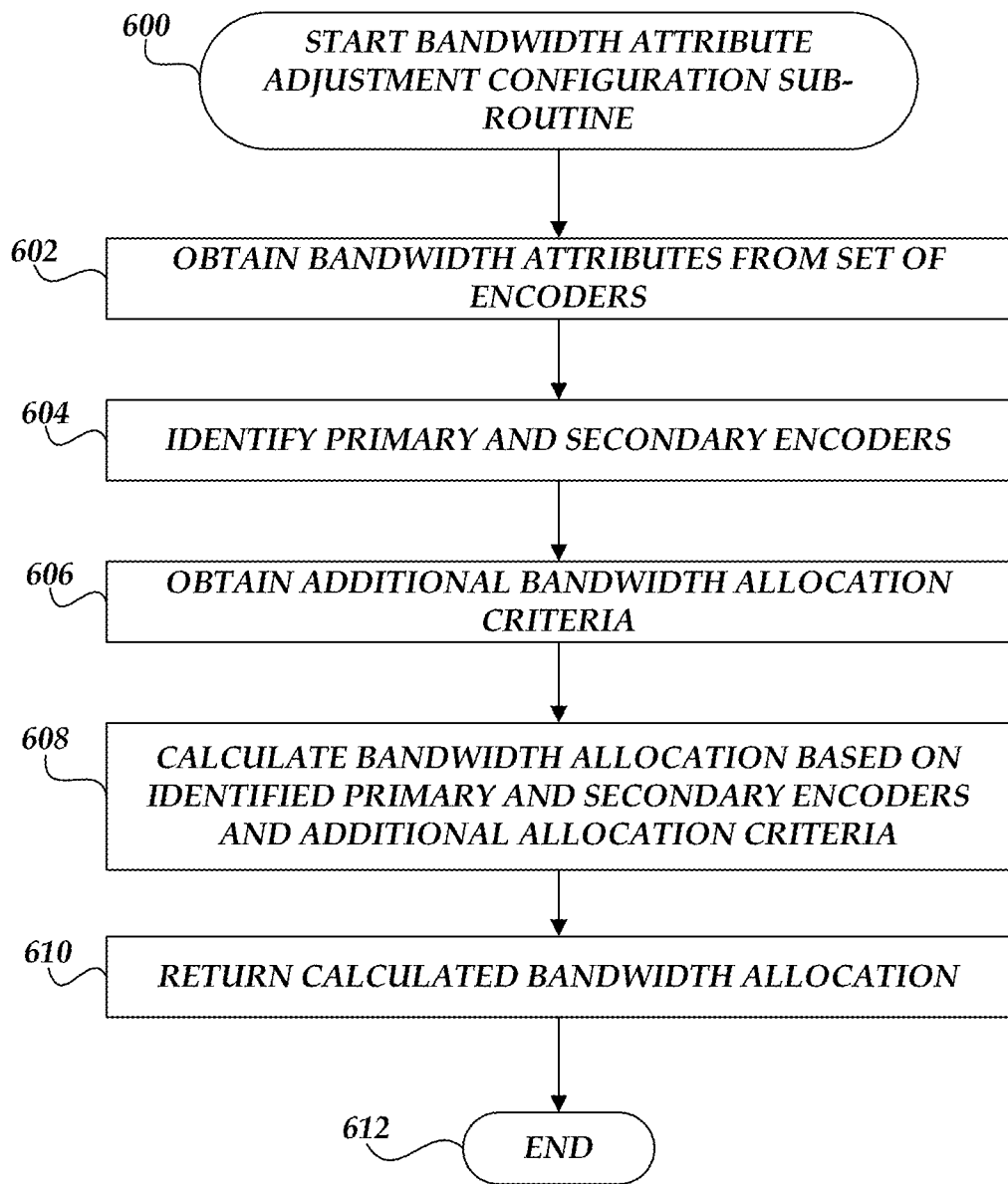
FIG. 6 is a flow diagram illustrative of a bandwidth allocation sub-routine implemented by a content delivery service in accordance with an illustrative embodiment.
Figure 7:
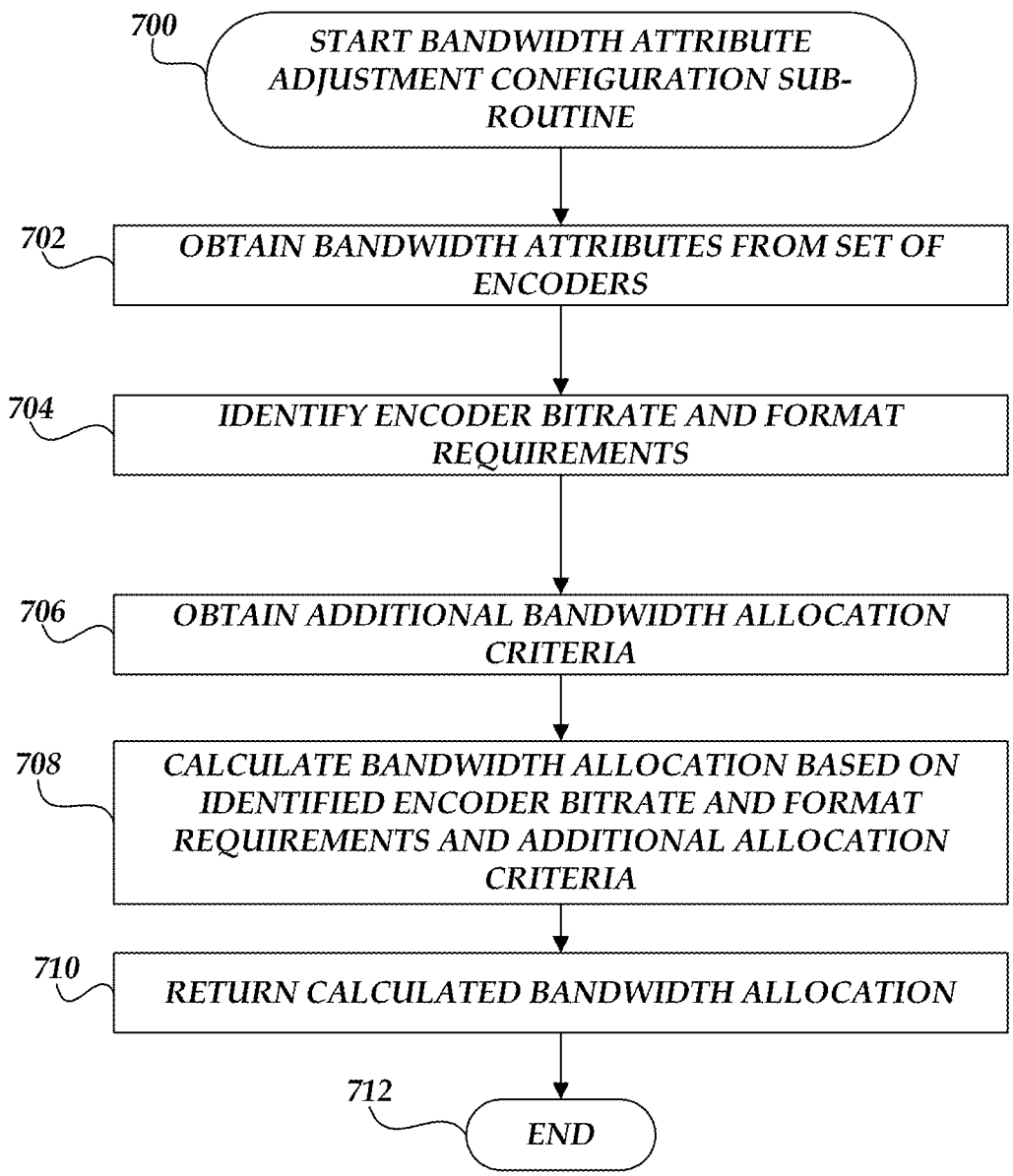
FIG. 7 is a flow diagram illustrative of an alternative bandwidth allocation sub-routine implemented by a content delivery service in accordance with an illustrative embodiment.

Additional embodiments related to allocation will also be described with regard to FIGS. 6 and 7.

At block 522, the management service 126 can transmit the allocated bandwidth or other control instructions to one or more individual encoding nodes 124. As described above, the individual encoding nodes 124 and the management service 126 can be configured to publish and process MQTT-based messages in a manner that facilitates reporting measured or detected bandwidth. More specifically, in one embodiment, MQTT-based messages are topic-based messages in which individual messages are associated solely with a topic and data payload but do not include any routing or addressing information. For example, MQTT-based messages do not include any information directly identifying an intended recipient of the message, such as specific network identifiers, network addresses and the like. This allows the sending components (e.g., the management service 126 or an encoding node configured with the management service functionality) to have less complex configurations for receiving or transmitting messages.

With continued reference to an MQTT-based example, additional network components receive the published messages from the senders and then forward the messages to recipient devices that have registered to receive messages published according to one or more topics. The network component can validate the recipients and transmit messages as they are received or in batch form. Illustratively (as referenced in FIG. 4E), the management service 126 can be configured to transmit MQTT-based messages to a set of encoder nodes 124 that have registered to receive MQTT-based messages published according to one or more topics. used by the encoding nodes 124. As previously described, the network component that acts as the intermediary can illustratively be a specially configured stand-alone component (e.g., a dedicated intermediary component) or can correspond to any previously discussed component of the content delivery service 120 that can be configured to apply the functionality. For example, an encoding node 124 may be configured with additional logic or functionality to implement intermediary functionality.

In some embodiments, the management service 126 may utilize a common topic to publish message with the attributed bandwidth or other control instructions. In such embodiments, individual encoding nodes of the set of encoding nodes 124 or subsets of the encoding nodes 124 can be configured to filter or process topics that correspond to the subsets of encoding nodes 124. In other embodiments, the management service 126 can utilize different topics for individual encoding nodes or set of encoding nodes 124. In still other embodiments, the management service 126 can publish topics based on the type of configuration information. For example, the management service 126 can publish topics based on "Bandwidth Allocation", "Alert", "Device Status", or other customized communication. Illustratively, the receiving nodes 124 can process the messages and implement the configuration, such as by adjusting the output of the encoding node. Routine 500 can then repeat to continue to receive content, encoded content and make additional bandwidth adjustments.

With reference now to FIG. 6, a sub-routine 600 for determining bandwidth adjustments based on specific configurations of encoding nodes will be described. As described above, in some embodiments, the determined available encoder bandwidth can make unequal allocations based on configuration of the encoders 124. In accordance with sub-routine 600, as described above, a set of encoding nodes 124 can be configured to encoded content according the same bitrate/format combination. In this regard, the encoded content from the set of encoding nodes 124 can be considered redundant or duplicative. Additionally, at least one of the encoding nodes 124 can be considered a primary source of the encoded content, while additional encoding nodes can be considered secondary or backup sources of the encoded content. In some examples, the additional encoding nodes can be further broken down into different tiers or levels of backup/redundancy (e.g., primary, secondary, tertiary, and the like).

At block 602, the management service 126 obtains bandwidth attribute information that facilitates identification of the configuration of the encoding nodes. Accordingly, the management service 126 may apply an adjustment factor or otherwise adjust allocated bandwidth based on a designated role of the encoding nodes 124 and, at block 604, processing the bandwidth information to identify designated roles, such as primary and second encoding nodes. At block 606, the management service 126 can obtain additional bandwidth allocation criteria, such as the criteria information discussed with regard to block 520 (FIG. 5).

At block 608, the management service 126 may allocate additional bandwidth to encoders that are considered primary sources of the encoded content to ensure that the encoded content is delivered with less errors, time lag, and the like. The management service 126 can also adjust the bandwidth allocation to secondary sources downward. In some embodiments, the bandwidth allocation may be dynamic such that the secondary source bandwidth allocation can be reduced based on current network conditions, performance of the primary source, predicted failure of the primary source, and the like. Such adjustment factors can include one or more variations of the adjustments described above with regard to prioritization criteria. Additionally, in additional embodiments, the management service 126 can further consider at least a portion of additional selection criteria as described above, such as prioritization criteria, to consider additional adjustments or adjustments in combination. For example, the management service 126 can make cumulative adjustments corresponding to an adjustment attributable to the designated role and an adjustment attributable to the evaluation of the additional selection criteria. In another example, the management service 126 can select only one of the adjustments, such as the greatest adjustment or the least adjustment. In still another example, the management service 126 can take an average adjustment or some statistical processing of multiple adjustments. At block 610, the management service 126 returns the calculated bandwidth allocation and the sub-routine 600 ends at block 612.

With reference now to FIG. 7, a sub-routine 700 for determining bandwidth adjustments based on specific configurations of encoding nodes will be described. As described above, in some embodiments, the determined available encoder bandwidth can make unequal allocations based on configuration of the encoders 124. In accordance with sub-routine 600, as described above, a set of encoding nodes 124 can be configured to encoded content according to differences in bitrate/format combination. In this regard, the encoded content from the set of encoding nodes 124 can be considered either as part of ABR (e.g., same content, different bitrate/format) or two different content streams. Illustratively, content with a higher bitrate/format combination would consume greater bandwidth in transmission. The designation of differences in encoding can be associated with specific bitrate/format combinations or according to categories of bitrate/format combinations. For example, the configurations may be associated with one of three classes of bitrate/format combination (e.g., "low resolution encoding", "standard resolution encoding", and "high resolution encoding." Accordingly, the management service 126 may apply an adjustment factor or otherwise adjust allocated bandwidth based on the configuration information of the encoding nodes 124.

At block 702, the management service 126 obtains bandwidth attribute information that facilitates identification of the configuration of the encoding nodes. Accordingly, the management service 126 may apply an adjustment factor or otherwise adjust allocated bandwidth based on a designated role of the encoding nodes 124 and, at block 704, processing the bandwidth information to identify bitrate/format requirements or attributes of the encoding nodes. At block 706, the management service 126 can obtain additional bandwidth allocation criteria, such as the criteria information discussed with regard to block 520 (FIG. 5).

At block 708, the management service 126 may allocate additional bandwidth to encoders that are configuration with a higher resolution of encoded content to ensure that the encoded content is delivered with less errors, time lag, and the like. The management service 126 can also adjust the bandwidth allocation to lower resolution downward. In some embodiments, the bandwidth allocation may also be dynamic such that the lower resolution encoding bandwidth allocation can be reduced based on current network conditions, performance of the encoders, predicted failure of the encoders, and the like. Such adjustment factors can include one or more variations of the adjustments described above with regard to prioritization criteria. Additionally, in additional embodiments, the management service 126 can further consider at least a portion of additional selection criteria as described above, such as prioritization criteria, to consider additional adjustments or adjustments in combination. For example, the management service 126 can make cumulative adjustments corresponding to an adjustment attributable to the determined configuration and an adjustment attributable to the evaluation of the additional selection criteria. In another example, the management service 126 can select only one of the adjustments, such as the greatest adjustment or the least adjustment. In still another example, the management service 126 can take an average adjustment or some statistical processing of multiple adjustments. At block 710, the management service 126 returns the calculated bandwidth allocation and the sub-routine 700 ends at block 712.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage input content comprising:
   one or more computing devices associated with a set of available original content provider computing devices, wherein at least a portion of the original content provider computing devices are configured to provide a plurality of input content streams to a content delivery service;
   one or more computing devices associated with a management service component of the content delivery service, wherein the management service component is configured to:
   receive a set of bandwidth measurements associated with the generation of encoded content streams based on the input content streams, wherein the set of bandwidth measurements transmitted by a plurality of encoding servers and wherein individual encoding servers of the plurality of encoding servers transmit the bandwidth measurement information in accordance with an IoT-based communication protocol;
   determine a total amount of available bandwidth associated with the plurality of encoding servers based on the received set of bandwidth measurements;
   modify the determined total amount of available bandwidth to form an updated available bandwidth;
   determining individual bandwidth allocations based on bitrate and format combinations for the plurality of encoding servers, wherein at least two or more encoders have different bitrate and format combinations; and
   transmit the determined individual bandwidth allocations to the plurality of encoding servers in accordance with the IoT-based communication protocol, wherein at least a portion of the encoding servers modify content encoding based on the transmitted individual bandwidth allocations.

2. The system of claim 1, wherein the bandwidth allocation criteria corresponds to an unequal distribution of the determined available bandwidth based on characterization of at least one encoding server as having a higher bitrate and formation combination.

3. The system of claim 1, wherein the bandwidth allocation criteria corresponds to an unequal distribution of the determined available bandwidth based on characterization of at least one encoding server as a lower bitrate and formation combination.

4. The system of claim 1, wherein the IoT-based communication protocol corresponds to the MQ Telemetry Transport communication protocol.

5. A computer-implemented method to manage content streaming comprising:
   generating, at the content delivery service, a plurality of encoded content streams from a plurality of encoding servers, the encoded content streams associated with original content stream information provided by original content providers, wherein at least two encoded content streams correspond to different bitrate and format combinations;
   determining, at the content delivery service, a total amount of available bandwidth for transmitting encoded content streams to a delivery service, the delivery service for transmitting encoded content streams to requesting user devices, wherein the total amount of available bandwidth is determined from individual bandwidth metric information provided by the plurality of encoded content streams;
   determining individual bandwidth allocations for the plurality of encoding servers based on application of bandwidth allocation criteria associated with bitrate and format combinations of the plurality of encoding servers to the determined total amount of available bandwidth; and causing the determined individual bandwidth allocations to be provided to the plurality of encoding servers in accordance with an IoT-based communication protocol, wherein at least a portion of the encoding servers modify content encoding based on the transmitted individual bandwidth allocations.

6. The computer-implemented method of claim 5, wherein determining individual bandwidth allocations for the plurality of encoding servers based on application of bandwidth allocation criteria includes determining an unequal distribution of the determined total amount of available bandwidth based on application of the bandwidth allocation criteria.

7. The computer-implemented method of claim 6, wherein determining an unequal distribution of the determined total amount of available bandwidth based on application of the bandwidth allocation criteria includes a first allocation based on designation of at least one encoding server as a higher bitrate and format combination and at least one encoding server as a lower bitrate and format combination.

8. The computer-implemented method of claim 7, wherein the higher bitrate and format combination corresponds to an encoding resolution.

9. The computer-implemented method of claim 7, wherein the higher bitrate and format combination corresponds to color information.

10. The computer-implemented method of claim 6, wherein determining an unequal distribution of the determined total amount of available bandwidth based on application of the bandwidth allocation criteria includes determining an unequal distribution based on a combination of bitrate and format and additional prioritization criteria.

11. The computer-implemented method of claim 10, wherein the prioritization criteria corresponds to at least one of an associated original content provider or a content type.

12. The computer-implemented method of claim 6, wherein determining an unequal distribution based on prioritization criteria includes associating a bandwidth multiplication factor on the basis of priority.

13. The computer-implemented method of claim 6, wherein determining an unequal distribution of the determined total amount of available bandwidth based on application of the bandwidth allocation criteria includes determining an unequal distribution based on a combination of bitrate and format and additional performance criteria.

14. The computer-implemented method of claim 13, wherein the performance criteria corresponds to error rate associated with one or more encoding servers.

15. The computer-implemented method of claim 6, wherein determining an unequal distribution of the determined total amount of available bandwidth based on application of the bandwidth allocation criteria includes determining an unequal distribution based on a combination of bitrate and format and additional financial criteria.

16. The computer-implemented method of claim 15, wherein the financial criteria corresponds to at least one of a characterized value of the encoded content generated by the encoding servers.

17. The computer-implemented method of claim 6 further comprising obtaining individual bandwidth measurement information form the plurality of encoding servers in accordance with an IoT-based communication protocol.

18. A computer-implemented method to manage transmission of encoded content streaming comprising:

determining a total amount of available bandwidth for transmitting encoded content streams from individual bandwidth metric information provided by the plurality of encoded content streams wherein at least two encoded content streams correspond to duplicative content streams in which at least one encoding server is characterized as having a higher bitrate and format combination relative to other encoding servers;

allocating the total amount of available bandwidth for a plurality of encoding servers based on application of bandwidth allocation criteria associated with characterized higher bitrate and format combination to the determined total amount of available bandwidth; and transmitting the determined individual bandwidth allocations to the plurality of encoding servers in accordance with an IoT-based communication protocol, wherein at least a portion of the encoding servers modify content encoding based on the transmitted individual bandwidth allocations.

19. The computer-implemented method of claim 18, wherein determining individual bandwidth allocations for the plurality of encoding servers based on application of bandwidth allocation criteria includes determining an unequal distribution of the determined total amount of available bandwidth based on application of the bandwidth allocation criteria.

20. The computer-implemented method of claim 18, wherein determining an unequal distribution of the determined total amount of available bandwidth based on application of the bandwidth allocation criteria includes determining an unequal distribution additionally based on prioritization criteria.

21. The computer-implemented method of claim 18, wherein determining an unequal distribution of the determined total amount of available bandwidth based on application of the bandwidth allocation criteria includes determining an unequal distribution additionally based on performance criteria.

22. The computer-implemented method of claim 18, wherein determining an unequal distribution of the determined total amount of available bandwidth based on application of the bandwidth allocation criteria includes determining an unequal distribution additionally based on financial criteria.

23. The computer-implemented method of claim 18 further comprising obtaining individual bandwidth measurement information from a plurality of servers in accordance with an IoT-based communication protocol.

* * * * *